United States Patent
Featherstone et al.

(10) Patent No.: US 12,227,426 B2
(45) Date of Patent: Feb. 18, 2025

(54) PROCESS FOR RECOVERY OF LITHIUM FROM A GEOTHERMAL BRINE

(71) Applicant: ENERGYSOURCE MINERALS LLC, San Diego, CA (US)

(72) Inventors: John L. Featherstone, El Centro, CA (US); Paul J. Hanson, Imperial, CA (US); Michael J. Garska, Calipatria, CA (US); Charles R. Marston, Midland, MI (US)

(73) Assignee: ILIAD IP COMPANY, LLC, Carlsbad, CA (US)

( * ) Notice: Subject to any disclaimer, the term of this patent is extended or adjusted under 35 U.S.C. 154(b) by 1209 days.

(21) Appl. No.: 16/797,292

(22) Filed: Feb. 21, 2020

(65) Prior Publication Data
US 2020/0189925 A1  Jun. 18, 2020

Related U.S. Application Data

(63) Continuation of application No. 16/010,286, filed on Jun. 15, 2018, now Pat. No. 10,604,414.

(60) Provisional application No. 62/671,489, filed on May 15, 2018, provisional application No. 62/520,024, filed on Jun. 15, 2017.

(51) Int. Cl.
| | | |
|---|---|---|
| C01D 15/04 | (2006.01) | |
| B01D 15/36 | (2006.01) | |
| C01D 15/02 | (2006.01) | |
| C01D 15/08 | (2006.01) | |

(52) U.S. Cl.
CPC ........... *C01D 15/04* (2013.01); *B01D 15/361* (2013.01); *C01D 15/02* (2013.01); *C01D 15/08* (2013.01)

(58) Field of Classification Search
CPC ........ C01D 15/04; C01D 15/02; C01D 15/08; B01D 15/361
USPC ...................................................... 423/179.5
See application file for complete search history.

(56) References Cited

U.S. PATENT DOCUMENTS

| | | |
|---|---|---|
| 1,154,602 A | 9/1915 | Best |
| 1,843,006 A | 1/1932 | Hillman et al. |
| 1,860,781 A | 5/1932 | Otto |
| 1,886,165 A | 11/1932 | Christensen |

(Continued)

FOREIGN PATENT DOCUMENTS

| | | |
|---|---|---|
| CA | 2429295 A1 | 11/2004 |
| CA | 3059899 A1 | 10/2018 |

(Continued)

OTHER PUBLICATIONS

Second Office Action; Argentina Patent Application No. 20190101300 dated Apr. 19, 2023.

(Continued)

*Primary Examiner* — Melissa S Swain
(74) *Attorney, Agent, or Firm* — Crowe & Dunlevy, P.C.

(57) ABSTRACT

This invention relates generally to a system and process for recovery of select minerals and lithium from a geothermal brine. The system and process are configured for the sequential recovery of zinc, manganese, and lithium from a Salton Sea Known Geothermal Resource Area brine. The system and process includes: 1) an impurity removal circuit; then 2) a continuous counter-current ion exchange (CCIX) circuit for selectively recovering lithium chloride from the brine flow and concentrating it using a CCIX unit; and then 3) a lithium chloride conversion circuit for converting lithium chloride to lithium carbonate or lithium hydroxide product.

18 Claims, 7 Drawing Sheets

(56) References Cited

U.S. PATENT DOCUMENTS

| | | |
|---|---|---|
| 2,340,188 A | 1/1944 | Jukkola |
| 2,396,220 A | 3/1946 | Wilson et al. |
| 2,445,826 A | 7/1948 | Hammerquist |
| 2,447,511 A | 8/1948 | Leaf |
| 2,964,381 A | 12/1960 | Goodenough |
| 2,977,185 A | 3/1961 | Goodenough |
| 3,306,700 A | 2/1967 | Neipert et al. |
| 3,321,268 A | 5/1967 | Copson et al. |
| 3,523,751 A | 8/1970 | Burkert et al. |
| 3,790,458 A | 2/1974 | Agladze et al. |
| 3,954,937 A | 5/1976 | Bodson |
| 4,016,075 A | 4/1977 | Wilkins |
| 4,036,713 A | 7/1977 | Brown |
| 4,067,789 A | 1/1978 | Harris et al. |
| 4,116,856 A | 9/1978 | Lee et al. |
| 4,116,858 A | 9/1978 | Lee et al. |
| 4,127,989 A | 12/1978 | Mickelson |
| 4,142,950 A | 3/1979 | Creamer et al. |
| 4,159,311 A | 6/1979 | Bauman et al. |
| 4,209,369 A | 6/1980 | Ogawa et al. |
| 4,221,767 A | 9/1980 | Lee et al. |
| 4,243,641 A | 1/1981 | Ishimori et al. |
| 4,244,190 A | 1/1981 | Lieffers |
| 4,251,338 A | 2/1981 | Retallack |
| 4,271,131 A | 6/1981 | Brown et al. |
| 4,276,180 A | 6/1981 | Matson |
| 4,291,001 A | 9/1981 | Repsher et al. |
| 4,304,666 A | 12/1981 | Van |
| 4,347,327 A | 8/1982 | Lee et al. |
| 4,348,295 A | 9/1982 | Burba |
| 4,348,296 A | 9/1982 | Bauman et al. |
| 4,348,297 A | 9/1982 | Bauman et al. |
| 4,376,100 A | 3/1983 | Lee et al. |
| 4,381,349 A | 4/1983 | Lee et al. |
| 4,405,463 A | 9/1983 | Jost et al. |
| 4,405,595 A | 9/1983 | Yang et al. |
| 4,429,535 A | 2/1984 | Featherstone |
| 4,430,311 A | 2/1984 | Lee et al. |
| 4,450,057 A | 5/1984 | Kelly |
| 4,461,714 A | 7/1984 | Burba |
| 4,472,362 A | 9/1984 | Burba |
| 4,477,367 A | 10/1984 | Burba |
| 4,492,083 A | 1/1985 | McCabe et al. |
| 4,500,434 A | 2/1985 | Jost et al. |
| 4,522,728 A | 6/1985 | Gallup et al. |
| 4,537,684 A | 8/1985 | Gallup et al. |
| 4,540,509 A | 9/1985 | Burba |
| 4,602,820 A | 7/1986 | Hard |
| 4,619,769 A | 10/1986 | Gritters et al. |
| 4,624,704 A | 11/1986 | Byeseda |
| 4,634,533 A | 1/1987 | Somerville et al. |
| 4,710,361 A | 12/1987 | Ostrea |
| 4,710,367 A | 12/1987 | Wong et al. |
| 4,718,236 A | 1/1988 | Awerbuch et al. |
| 4,727,167 A | 2/1988 | Burba et al. |
| 4,728,438 A | 3/1988 | Featherstone et al. |
| 4,745,977 A | 5/1988 | Love et al. |
| 4,762,656 A | 8/1988 | Ballard et al. |
| 4,763,479 A | 8/1988 | Hoyer et al. |
| 4,765,912 A | 8/1988 | Totten |
| 4,765,913 A | 8/1988 | Featherstone |
| 4,776,961 A | 10/1988 | Gritters et al. |
| 4,830,766 A | 5/1989 | Gallup et al. |
| 4,869,066 A | 9/1989 | Pye et al. |
| 4,874,529 A | 10/1989 | Featherstone et al. |
| 4,978,457 A | 12/1990 | Gallup et al. |
| 5,015,541 A | 5/1991 | Evans |
| 5,073,270 A | 12/1991 | Gallup et al. |
| 5,082,492 A | 1/1992 | Gallup et al. |
| 5,098,578 A | 3/1992 | Gallup et al. |
| 5,135,652 A | 8/1992 | Boateng |
| 5,145,656 A | 9/1992 | Gallup et al. |
| 5,200,165 A | 4/1993 | Harper et al. |
| 5,219,550 A | 6/1993 | Brown et al. |
| 5,229,003 A | 7/1993 | Duyvesteyn |
| 5,236,491 A | 8/1993 | Duyvesteyn et al. |
| 5,240,687 A | 8/1993 | Gallup et al. |
| 5,244,491 A | 9/1993 | Brown et al. |
| 5,246,593 A | 9/1993 | Gallup |
| 5,246,684 A | 9/1993 | Brown et al. |
| 5,254,225 A | 10/1993 | Gallup |
| 5,358,700 A | 10/1994 | Brown et al. |
| 5,389,349 A | 2/1995 | Bauman et al. |
| 5,409,614 A | 4/1995 | Gallup et al. |
| 5,427,691 A | 6/1995 | Kuyucak et al. |
| 5,439,058 A | 8/1995 | Malbrel et al. |
| 5,441,712 A | 8/1995 | Duyvesteyn et al. |
| 5,451,383 A | 9/1995 | Leavitt |
| 5,595,717 A | 1/1997 | Harper et al. |
| 5,599,516 A | 2/1997 | Bauman et al. |
| 5,656,172 A | 8/1997 | Kitz et al. |
| 5,711,019 A | 1/1998 | Tomczuk et al. |
| 5,833,844 A | 11/1998 | Leavitt |
| 5,904,653 A | 5/1999 | Hatfield et al. |
| 5,919,287 A | 7/1999 | Moreau |
| 5,932,644 A | 8/1999 | Fujii |
| 5,935,541 A | 8/1999 | Bonnet et al. |
| 5,939,043 A | 8/1999 | Yahagi |
| 5,951,843 A | 9/1999 | Itoh et al. |
| 5,951,954 A | 9/1999 | Fisher et al. |
| 5,993,759 A | 11/1999 | Wilkomirsky |
| 5,997,836 A | 12/1999 | Sato et al. |
| 6,017,500 A | 1/2000 | Mehta |
| 6,046,131 A | 4/2000 | Tanihara |
| 6,048,507 A | 4/2000 | Amouzegar et al. |
| 6,051,141 A | 4/2000 | Forbes et al. |
| 6,080,696 A | 6/2000 | Duke et al. |
| 6,103,422 A | 8/2000 | Kanai |
| 6,139,498 A | 10/2000 | Katsman et al. |
| 6,207,126 B1 | 3/2001 | Boryta et al. |
| 6,280,693 B1 | 8/2001 | Bauman et al. |
| 6,458,184 B2 | 10/2002 | Featherstone |
| 6,517,701 B1 | 2/2003 | Geisler |
| 6,537,796 B1 | 3/2003 | Premuzic et al. |
| 6,555,078 B1 | 4/2003 | Mehta |
| 6,592,832 B1 | 7/2003 | Friedrich et al. |
| 6,682,644 B2 | 1/2004 | Featherstone et al. |
| 6,726,889 B2 | 4/2004 | Choi et al. |
| 6,761,865 B1 | 7/2004 | Gallup et al. |
| 6,770,187 B1 | 8/2004 | Puetter et al. |
| 6,921,522 B2 | 7/2005 | Boryta et al. |
| 7,026,072 B2 | 4/2006 | Barker et al. |
| 7,060,238 B2 | 6/2006 | Saidi et al. |
| 7,279,103 B2 | 10/2007 | Burckle et al. |
| 7,390,466 B2 | 6/2008 | Boryta et al. |
| 7,504,036 B2 | 3/2009 | Gottlieb et al. |
| 7,678,470 B2 | 3/2010 | Yoon et al. |
| 7,691,347 B2 | 4/2010 | Gillaspie et al. |
| 7,708,972 B2 | 5/2010 | Coustry et al. |
| 7,824,766 B2 | 11/2010 | Eplee et al. |
| 8,197,707 B2 | 6/2012 | Lefenfeld et al. |
| 8,287,829 B2 | 10/2012 | Harrison et al. |
| 8,309,043 B2 | 11/2012 | Alurralde et al. |
| 8,313,653 B2 | 11/2012 | Featherstone et al. |
| 8,435,468 B2 | 5/2013 | Harrison et al. |
| 8,454,816 B1 | 6/2013 | Harrison et al. |
| 8,518,232 B1 | 8/2013 | Harrison et al. |
| 8,574,519 B2 | 11/2013 | Harrison et al. |
| 8,597,521 B1 | 12/2013 | Harrison |
| 8,702,975 B2 | 4/2014 | Gallup et al. |
| 8,728,304 B2 | 5/2014 | Gallup et al. |
| 8,741,150 B2 | 6/2014 | Chung et al. |
| 8,741,256 B1 | 6/2014 | Harrison |
| 8,753,594 B1 | 6/2014 | Burba et al. |
| 8,894,965 B2 | 11/2014 | Vera-Castaneda |
| 9,024,105 B1 | 5/2015 | Corradi |
| 9,034,294 B1 | 5/2015 | Harrison |
| 9,034,295 B2 | 5/2015 | Harrison |
| 9,051,827 B1 | 6/2015 | Harrison |
| 9,057,117 B2 | 6/2015 | Harrison et al. |
| 9,068,247 B2 | 6/2015 | Marston et al. |
| 9,222,149 B2 | 12/2015 | Harrison |
| 9,238,851 B1 | 1/2016 | Harrison et al. |
| 9,249,478 B2 | 2/2016 | Harrison et al. |

(56) References Cited

U.S. PATENT DOCUMENTS

| | | |
|---|---|---|
| 9,447,675 B2 | 9/2016 | Yean et al. |
| 9,527,753 B1 | 12/2016 | Harrison et al. |
| 9,644,126 B2 | 5/2017 | Harrison et al. |
| 9,644,866 B2 | 5/2017 | Harrison et al. |
| 9,650,555 B2 | 5/2017 | Harrison et al. |
| 9,771,632 B2 | 9/2017 | Kim et al. |
| 9,834,449 B2 | 12/2017 | Harrison |
| 10,087,083 B2 | 10/2018 | Chung et al. |
| 10,150,056 B2 | 12/2018 | Snydacker |
| 10,266,915 B2 | 4/2019 | Paranthaman et al. |
| 10,385,423 B2 | 8/2019 | Chung et al. |
| 10,478,751 B2 | 11/2019 | Chung et al. |
| 10,626,020 B2 | 4/2020 | Reed |
| 10,648,061 B2 | 5/2020 | Cheng et al. |
| 10,773,970 B2 | 9/2020 | Harrison |
| 10,850,254 B2 | 12/2020 | Boualleg et al. |
| 11,203,542 B2 | 12/2021 | Liberatore |
| 2001/0000597 A1 | 5/2001 | Featherstone |
| 2001/0011645 A1 | 8/2001 | Silva et al. |
| 2001/0028871 A1 | 10/2001 | Harrison et al. |
| 2002/0018929 A1 | 2/2002 | Dai et al. |
| 2003/0010716 A1 | 1/2003 | Wankat |
| 2003/0026749 A1 | 2/2003 | Burrows et al. |
| 2003/0155301 A1 | 8/2003 | Silva et al. |
| 2003/0226761 A1 | 12/2003 | Featherstone et al. |
| 2003/0228251 A1 | 12/2003 | Boryta et al. |
| 2004/0005267 A1 | 1/2004 | Boryta et al. |
| 2004/0018135 A1 | 1/2004 | Adamson et al. |
| 2004/0149590 A1 | 8/2004 | Featherstone et al. |
| 2005/0011753 A1 | 1/2005 | Jackson et al. |
| 2005/0265909 A1 | 12/2005 | Kajiya et al. |
| 2005/0274677 A1 | 12/2005 | Isaac |
| 2006/0093911 A1 | 5/2006 | Chiga et al. |
| 2006/0115396 A1 | 6/2006 | Boryta et al. |
| 2006/0115407 A1 | 6/2006 | Boryta et al. |
| 2006/0115410 A1 | 6/2006 | Boryta et al. |
| 2007/0114134 A1 | 5/2007 | Legg et al. |
| 2007/0148077 A1 | 6/2007 | Boryta et al. |
| 2007/0160516 A1 | 7/2007 | Boryta et al. |
| 2008/0233042 A1 | 9/2008 | Boryta et al. |
| 2009/0081105 A1 | 3/2009 | Bourcier et al. |
| 2009/0107230 A1 | 4/2009 | Okcay et al. |
| 2009/0214414 A1 | 8/2009 | Boryta et al. |
| 2010/0000597 A1 | 1/2010 | Cousins |
| 2010/0301267 A1 | 12/2010 | Mao et al. |
| 2010/0327223 A1 | 12/2010 | Zaghib et al. |
| 2011/0044882 A1 | 2/2011 | Buckley et al. |
| 2011/0123427 A1 | 5/2011 | Boryta et al. |
| 2011/0174739 A1 | 7/2011 | Chung et al. |
| 2011/0200508 A1 | 8/2011 | Harrison et al. |
| 2012/0235084 A1 | 9/2012 | Lefenfeld et al. |
| 2013/0001168 A1 | 1/2013 | Kim et al. |
| 2013/0108781 A1 | 5/2013 | Harrison et al. |
| 2014/0054233 A1 | 2/2014 | Harrison |
| 2014/0165563 A1 | 6/2014 | Harrison et al. |
| 2014/0174745 A1 | 6/2014 | Harrison et al. |
| 2014/0187452 A1 | 7/2014 | Harrison et al. |
| 2014/0231041 A1 | 8/2014 | Harrison et al. |
| 2014/0239221 A1 | 8/2014 | Harrison et al. |
| 2014/0239224 A1 | 8/2014 | Burba et al. |
| 2014/0366535 A1 | 12/2014 | Harrison et al. |
| 2015/0090457 A1 | 4/2015 | Harrison |
| 2015/0152309 A9 | 6/2015 | Harrison et al. |
| 2015/0259215 A1 | 9/2015 | Harrison |
| 2016/0317998 A1 | 11/2016 | Boualleg et al. |
| 2018/0072581 A1 | 3/2018 | Harrison |
| 2019/0314784 A1 | 10/2019 | Lecocq et al. |
| 2020/0010926 A1 | 1/2020 | Zhang et al. |
| 2020/0316557 A1 | 10/2020 | Boualleg et al. |
| 2021/0079496 A1 | 3/2021 | Harris et al. |
| 2021/0139339 A1 | 5/2021 | Riabtsev et al. |

FOREIGN PATENT DOCUMENTS

| | | |
|---|---|---|
| CL | 200102190 | 11/2002 |
| CN | 1038497 C | 5/1998 |
| CN | 1626443 A | 6/2005 |
| CN | 1243112 C | 2/2006 |
| CN | 201825992 U | 5/2011 |
| CN | 102031368 B | 1/2013 |
| DE | 19631794 A1 | 8/1997 |
| DE | 19809420 A1 | 9/1999 |
| DE | 112012006180 B4 | 4/2017 |
| DE | 102017221288 A1 | 8/2018 |
| DE | 102018002643 A1 | 10/2019 |
| EP | 0034137 A1 | 8/1981 |
| EP | 0103035 A1 | 3/1984 |
| EP | 0117316 B1 | 8/1986 |
| EP | 0094983 B1 | 12/1989 |
| EP | 1900688 A1 | 3/2008 |
| EP | 2591130 B1 | 5/2017 |
| EP | 3050981 B1 | 3/2018 |
| EP | 3086874 B1 | 11/2018 |
| EP | 3487597 A1 | 5/2019 |
| EP | 2749535 B1 | 7/2019 |
| EP | 3524575 A4 | 10/2019 |
| EP | 3382043 B1 | 8/2020 |
| EP | 3326974 B1 | 1/2021 |
| EP | 3464181 B1 | 3/2021 |
| EP | 3394302 B1 | 5/2021 |
| EP | 3290393 B1 | 1/2022 |
| FR | 2446863 A1 | 8/1980 |
| GB | 191421737 A | 10/1915 |
| GB | 895690 A | 5/1962 |
| GB | 1469011 A | 3/1977 |
| GB | 2068348 B | 6/1983 |
| GB | 2190668 B | 12/1989 |
| JP | 8529963 A | 1/1977 |
| JP | 85531437 A | 3/1980 |
| JP | 856139194 A | 10/1981 |
| JP | S56160320 A | 12/1981 |
| JP | S58131190 A | 8/1983 |
| JP | S58143885 A | 8/1983 |
| JP | S58205580 A | 11/1983 |
| JP | S59154192 A | 9/1984 |
| JP | S59173188 A | 10/1984 |
| JP | S6090817 A | 5/1985 |
| JP | S62252326 A | 11/1987 |
| JP | H01315389 A | 12/1989 |
| JP | 3321602 B2 | 6/2002 |
| JP | 2004225144 A | 8/2004 |
| JP | 3691027 B2 | 6/2005 |
| JP | 2009046390 A | 3/2009 |
| JP | 2009056379 A | 3/2009 |
| JP | 6490089 B2 | 3/2019 |
| RU | 2157338 C2 | 10/2000 |
| RU | 2157339 C2 | 10/2000 |
| RU | 2223142 C2 | 2/2004 |
| WO | 9418121 A1 | 8/1994 |
| WO | 9620291 A1 | 7/1996 |
| WO | 1996020291 A1 | 7/1996 |
| WO | 9914403 A1 | 3/1999 |
| WO | 0230570 A1 | 4/2002 |
| WO | 2009006575 A1 | 1/2009 |
| WO | 2014170863 A1 | 10/2014 |
| WO | 2017039724 A1 | 3/2017 |
| WO | 2018015693 A1 | 1/2018 |

OTHER PUBLICATIONS

"Arsenic Removal with Iron(II) and Iron(III) in Waters with High Silicate and Phosphate Concentrations. Roberts et al. (Relevant Abstract). Environ. Sci. Technol., 2004, 38 (1), pp. 307-315. Nov. 2003.".

"Berthold, C.E., and F.M. Stephens. Magmax No. 1 Geothermal Brine Bulk Solids Precipitation Pilot Plant—Engineering Design. (contract JO265057, Hazen Research, Inc.). Bureau of Mines OFR 127-778, 1978, 84 pp.".

(56) References Cited

OTHER PUBLICATIONS

"Berthold, C.E., and F.M. Stephens., The Recovery and Separation of Mineral Values from Geothermal Brines (contract HO144104, Hazen Research Inc.), Bureau of Mines OFR 81-75, 1975, 39pp; NTIS, PB, 245 686.".
"Berthold, C.E., P. Hadzeriga, D.M. Gillespie. Process Technology for Recovering Geothermal Brine Minerals. BuMines OFR 35-75, 1975, 255 pp.; Na-Springfield, Va., PB 241 867/AS.".
"Bourcier, W., Martin, S., Viani B., Bruton C., "Developing a Process for Commercial Silica Production from Geothermal Brines," Lawrence Livermore National Laboratory, Report No. UCRL-JC-143426, Apr. 11, 2001.".
"Bourcier, W.L, Lin, M., Nix, G., "Recovery of Minerals and Metals from Geothermal Fluids," Lawrence Livermore National Laboratory, Report No. UCRL-CONF-215135, Sep. 8, 2005.".
"Byeseda J.J., and Hunter, J.D., "Metal Recovery from Imperial Valley Hypersaline Brine," Geothermal Resources Council, Transactions, vol. 9-Part II, Aug. 1985.".
"CalEnergy, "Iron Precipitation Study, Iron Removal System," Zinc Recovery Plant, vol. V—Solvent Extraction. Feb. 2001.".
"Chemical Behaviour Of Geothermal Silica After Precipitation from Geothermal Fluids with Inorganic Flocculating Agents at The Hawaii Geothermal Project Well-A (Hgp-A). Dr. Eric Heinen De Carlo. (Relevant Text: p. 3, 42).".
"DiPippo, R., "Geothermal Power Plants Around the World," Sourcebook On the Production of Electricity of Electricity from Geothermal Energy, Brown University, Report Under Sponsorship of United States Department of Energy, Mar. 1980, p. 873.".
"Duyvesteyn, W.P.C., "Recovery of Base Metals from Geothermal Brines," Geothermics, vol. 21, Issues 5-6, Oct.-Dec. 1992, pp. 773-799.".
"Featherstone, J.L., Butler, S., Bonham, E., "Comparison of Crystallizer Reactir Clarifier and pH Mod Porcess Technologies at the Salton Sea Goethermal Resource," World Geothermal Congress, 1995.".
"Featherstone, J.L., Gallup, D., Harrison, S., Jenkins, D., Hirtz, P., "Compatibility Testing of Salton Sea Geothermal Brines," Proceedings World Geothermal Congress 2015, Melbourne Australia, Apr. 19-25, 2015.".
"Featherstone, J.L., Powell, D.R., "Stabilization of Highly Saline Geothermal Brine," J. Pet Tech. (Apr. 1981), pp. 727-734.".
"Featherstone, J.L., Van Note, R.H., "A Cost Effective Treatment System for The Stabilization of Spent Geothermal Brines," Geothermal Resource Council, Transactions, vol. 3, Sep. 1979, pp. 201-204.".
"First Office Action, Argentina Patent Application No. P190101300".
"First Technical Report No. 287/2021 in Bolivian Patent Application No. SP 75-2019 dated Dec. 14, 2020".
"Gallup, D., "The Effect of Iron on PH Modification Scale Control Technology." Letter to Darrell Jan. 12, 1993. Brea, California.".
"Gallup, D.L. "The Use of Reducing agents for Control of Ferris Silicate Scale Depositions." Geothermics, vol. 22 No. 1, 1993.".
"Gallup, D.L., "Aluminum Silicate Scale formation and Inhibition (2): Scale Solubilities and Laboratory and Field Inhibition Tests," Geothermics, vol. 27, No. 4 pp. 485-501, 1998".
"Gallup, D.L., "Iron Silicate Scale Formation and Inhibition at the Salton Sea Geothermal Field," Geothermics, vol. 18, pp. 97-103, 1989.".
"Gallup, D.L., Featherstone, J.L., "Control of NORM Deposition from Salton Sea Geothermal Brines," Geotherm. Sci. & Tech., 1995 vol. 4 (4) pp. 215-226.".
Gallup, D.L., Featherstone, J.L., "Lime Mine—A Process for Mitigating Injection Well Damage at the Salton Sea—California (USA) Geothermal Field World Geothermal Congress, 1995.".
"Gallup, D.L., Unocal Corporation Science & Technology Division, "The Influence of Iron on the Solubility of Amorphous Silica in Hyper-Saline Geothermal Brines," EPRI 2nd International Symposium on Chemistry in High Temperature Aqueous Solutions.".
"Grens, J.Z., Ownes, L.B., "Field Evaluation of Scale Control Methods—Acidification," Geothermal Resource Council, Transactions, vol. 1, May 1977.".
"Harrar, J.E., Locke, F.E., Otto, C.H., Loreusen, L.H., Frey, W.F., and Snell, E.O., "On-Line Test of Silica from Hypersaline Geothermal Brines III, Scaling Measurements and Test of Other Methods of Brine Modification," Lawrence Livermore National Laborator".
"Harrar, J.E., Otto, C.H., Hill, J.H., Morris, C.J., Lim, R., and Deutscher, S.B., "Determination of the Rate of Formation of Solids from Hypersaline Brine as a Function of pH," Lawrence Livermore National Laboratory, Report No. UCID-17596, Sep. 1977.".
"Harrar, J.E., Otto, C.H., Hill, J.H., Morris, C.J., Lim, R., and Deutscher, S.B., Ryon, R.W., and Tardiff, G.E., "Studies of Brine Chemistry, Precipitation of Solids, and Scale Formation at the Salton Sea Geothermal Field," Lawrence Livermore National Labo".
"Hill, J.H., Harrar, J.E., Otto, Jr., C.H., Deutscher S.B., Crampton, H.E., Grogran, R.G., Hendricks, V.H., "Apparatus and Techniques for the Study of Precipitation of Solids and Silica from Hypersaline Geothermal Brine," Lawrence Livermore Laboratory, Repo".
"Laboratory investigation of silica removal from geothermal brines to control silica scaling and produce usable silicates. Darrell L.Gallup, Frankie Sugiaman, Vilma Capuno, Alain Manceau. Relevant Abstract.".
"Lithium Extraction from Wairakei Geothermal Waters. Rothbaum H. P.; Middendorf K. New Zealand Journal of Technology 2(4): 231-235".
"Maimoni, Arturo, A Cementation Process for Minerals Recovery from Salton Sea Geothermal Brines; UCRL-53252, DE82 14954, Jan. 26, 1982".
"Manceau, A., Ildefonse, P.H., Hazeman J.L., Flank, A.M., Gallup, D., "Crystal Chemistry of Hydrous Iron Silicate Scale Deposits at the Salton Sea Geothermal Field," Clays and Clay Minerals, vol. 43, No. 3, 304-317, 1995.".
"McLin, K.S., Moore, J.N., Hulen, J., Bowman, J.R., Berard, B., "Mineral Characterization of Scale Deposits in Injection Wells; Coso and Salton Sea Geothermal Fields, CA," Proceedings, Thirty-First Workshop on Geothermal Reservoir Engineering Stanford Univer".
"Miller, D.G., Piwinskii, A.J., Yamauchi, R., "The Use of Geochemical-Equilibrium Computer Calculations to Estimate Precipitation from Geothermal Brines," Lawrence Livermore Laboratory, Report No. UCRL-52197, Jan. 28, 1977.".
"Mineral recovery from salton sea geothermal brine. A. Maimoni.".
"Mining economic benefits from geothermal brine. Ted J. Clutter.".
"Mining Geothermal Resources. Adam Wallace".
"Modeling Silica Sorption to Iron Hydroxide. Davis, C.; Chen, H. and Edwards, M. (Abstract). Publication Date (Web): Dec. 28, 2001.".
"Molnar, R., Fleming, C., "The application of Ion Exchange Technology to Zinc Recovery for CalEnergy Minerals LLC," (Jul. 15, 2004)".
"Owen, L.B., "Precipitation of Amorphous Silica from High-Temperature Hypersaline Geothermal Brines," Lawrence Livermore Laboratory, Report No. UCRL-51866, Jun. 1975".
"Quong, R., "Scaling Characteristics in the Geothermal Loop Experimental Facility at Niland, California," Lawrence ivermore Laboratory, Report No. UCRL-52162, Nov. 1, 1976.".
"Recovery of Zinc from an Industrial Zinc Leach Residue by Solvent Extraction using D2EHPA. (Jan. 2009). E. Vahidi, F.Rashchi, D.Moradkhani.".
"Response to Examination Report—94(3), European Application No. 19803715.2".
"Response to Second Examination Report—94(3), European Application No. 19803715.2".
"San Diego Gas and Electric. Geothermal Loop Experimental Facility, Final Report, Apr. 1980; National Technical Information Services, Springfield, Va., DOE-ET-28443-TI.".
"Schroeder, R.C., "Modeling the Temperature-Dependent Scale Accumulation from Geothermal Brine," Lawrence Livermore Laboratory, Report No. UCRL-52145, Sep. 23, 1976.".
"Schultze, L.E., "Techniques for Recovering Metals Values from Postflash Geothermal Brines," Geothermal Resources Council, Transactions, vol. 8, Aug. 1984.".

(56) References Cited

OTHER PUBLICATIONS

"Schultze, L.E., and D.J. Bauer, "Comparison of Methods for Recovering Metal Values from Salton Sea Brine," Geothermal Resource Council Testimonial. No. 6, Oct. 1982".

"Schultze, L.E., Bauer, D.J., "Recovering Lithium Chloride from a Geothermal Brine," Bureau of Mines RI 8883, 1984.".

"Schultze, L.E., Bauer, J.D., "Recovering Zinc-Lead Sulfide from a Geothermal Brine," Bureau of Mines RI 8922, 1985.".

"Schultze, Operation of Mineral Recovery Unit on Brine from the Salton Sea known Geothermal Resources Council, 1984, pp. 2-5, vol. 8, Bureau of Mines, Reno, Nevada.".

"Second Office Action, Chilean Patent Application No. 2938-2020".

Pascua, Chelo Supnet, et al., "Uptake of dissolved arsenic during the retrieval of silica from spent geothermal prine".

"WO/ISR, PCT/US2019/030634".

"Water Treatment's Gordian Knot. D. Konstantinos Ph.D. (Relevant Text: p. 29-31). May 2003. Iron Removal".

"Water Reduction at Skorpion Zinc and the Impact on the Environment. (2009). H F Fuls; J Kruger; P van Greunen.".

"Signorotti, V., Hunter C.C., "Imperial Valley's Geothermal Comes of Age," Geothermal Resource Council Bulletin," vol. 21, No. 9. Sep./Oct. 1992. pp. 277-288.

"Silica Extraction at the Mammoth Lakes Geothermal Site. (Jun. 2006). W. Bourcier et al.".

"Silica Removal from Mokai, New Zealand, Geothermal Brine by Treatment with Lime and a Cationic Precipitant. Uedaa et al. Geothermics 32 (2003) 47-61.".

"Tardiff, G.E, "Using Salton Sea Geothermal Brines for Electrical Power: A Review of Progress in Chemistry Materials Technology—1976 Status," Lawrence Livermore Laboratory, Report No. UCRL-79468, May 31, 1977.".

"Tardiff, G.E., "Taming Geothermal Brines for Electrical Power," Energy & Technology Rewview, Lawrence Livermore National Laboratory, UCRL-52000-77-7, Jul. 1977, pp. 10-19.".

"Technology Review of Mineral Extraction from Separated Geothermal Water. E. Mrockzek: B. Carey: M. Climo; Y. Li. GNS Science Report 2015/25 (2015).".

Examination Report-94(3); European Patent Application No. 19803715.2 dated Jun. 1, 2023.

Examination Report dated Aug. 9, 2023 in corresponding Canadian Patent Application No. 3100313.

First Office Action in related Chilean Patent Application N° 2938-2020 dated Dec. 28, 2021, with English Machine translation.

Communication pursuant to Article 94(3) EPC dated Feb. 8, 2022 in related European Application No. 19803715.2.

Examination Report issued in connection with related European Application No. 19803715.2 dated Aug. 6, 2021.

PCT/US2019/0360634, International Search Report and Written Opinion, Aug. 16, 2019, Applicant: EnergySource Minerals LLC.

Supplementary European Search Report in connection with related European Application No. 19803715.2 dated May 12, 2021.

Technical Report No. 287/2021 in related Bolivian Patent Application No. SP 75-2019 dated Dec. 28, 2021.

Non-Final Office Action dated Apr. 10, 2024 in connection with related U.S. Appl. No. 16/797,274.

PROCESS FOR RECOVERY OF LITHIUM FROM A GEOTHERMAL BRINE

CROSS REFERENCE TO RELATED APPLICATIONS

This application is a continuation application of U.S. patent application Ser. No. 16/010,286 filed on Jun. 15, 2018, which claims the benefit of U.S. Provisional Patent Application No. 62/520,024 filed on Jun. 15, 2017 and U.S. Provisional Patent Application No. 62/671,489 filed on May 15, 2018. This application incorporates each of said applications by reference into this document as if fully set out at this point.

BACKGROUND OF THE INVENTION

1. Field of the Invention

This invention relates generally to a system and process for recovery of lithium from a geothermal brine, and more particularly to a system and sequential process for recovery of zinc, manganese, lithium or a combination thereof from a Salton Sea Known Geothermal Resource Area brine.

2. Description of the Related Art

Salton Sea Known Geothermal Resource Area is located in the Salton Trough, a major trans-tensional rift between the Pacific plate, on the west, and the North American plate, on the east, which merges southward through Mexico into the long, narrow Gulf of California.

The Salton Sea Known Geothermal Resource Area has the most geothermal capacity potential in the U.S. Geothermal energy, the harnessing of heat radiating from the Earth's crust, is a renewable resource that is capable of cost-effectively generating large amounts of power. In addition, the Salton Sea Known Geothermal Resource Area is one of North America's prime sources of alkali metals, alkaline earth metals and transition metals, such as lithium, potassium, rubidium, iron, zinc and manganese.

Brines from the Salton Sea Known Geothermal Resource Area are unusually hot (up to at least 390° C. at 2 km depth), hypersaline (up to 26 wt. %), and metalliferous (iron (Fe), zinc (Zn), lead (Pb), copper (Cu)). The brines are primarily sodium (Na), potassium (K), calcium (Ca) chlorides with up to 25 percent of total dissolved solids; they also contain high concentrations of metals such as Fe, Mn, Li, Zn, and Pb. While the chemistry and high temperature of the Salton Sea brines have led to the principal challenges to the development of the Salton Sea Known Geothermal Resource Area, lithium and these rare earth elements typically maintain high commodity value and are used in a range of specialized industrial and technological applications.

It is therefore desirable to provide an improved system and process for recovery of lithium from a geothermal brine.

It is further desirable to provide a system and process for recovery of lithium from a Salton Sea Known Geothermal Resource Area brine.

It is still further desirable to provide a system and sequential process for recovery of zinc, manganese, lithium or a combination thereof from a Salton Sea Known Geothermal Resource Area brine.

It is still further desirable to provide a system and process for sequential recovery of zinc, manganese, and lithium from a Salton Sea Known Geothermal Resource Area brine using impurity removal, selective recovery of lithium chloride, and selective conversion to lithium carbonate.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates to a process of recovering lithium from a brine, such as a geothermal brine. The process includes providing the brine having lithium, and producing a lithium-rich solution from the brine by sequentially circulating the brine through a plurality of process zones of a rotating or indexing manifold valve system. The manifold valve system has a plurality of ion exchange beds or columns containing a lithium selective adsorbent or resin. The process then includes recovering lithium chloride, lithium hydroxide, lithium carbonate, or a combination thereof from the lithium-rich solution.

Prior to the step of producing the lithium-rich solution, the process can further include producing a clarified or polished brine from the brine, the clarified or polished brine comprising lithium. The clarified or polished brine can be produced by selectively removing impurities from the brine and/or selectively recovering one or more metals, minerals or a combination thereof from the brine. In addition, the impurities can be removed by selectively removing at least iron and silica from the geothermal brine to form a substantially iron and silica free brine, and then, selectively at least removing manganese and zinc from the substantially iron and silica free brine to form the clarified brine. Moreover, the process can include selectively removing monovalent ions, divalent ions or both from the clarified brine to form the polished brine, such as selectively removing calcium, magnesium, boron, or a combination thereof from the clarified brine using an ion exchange circuit to form the polished brine.

The process step of the lithium-rich solution can further include sequentially circulating the brine through the process zones of a continuous counter-current ion exchange circuit of the manifold valve system. Fluid flow through the ion exchange circuit can be controlled by pumping flow rates and a predetermined timing of rotation or indexing of the manifold valve system whereby the exchange beds or columns continually cycle through the process zones. Additionally, the process zones of the continuous counter-current ion exchange circuit of the manifold valve system can be configured in parallel, in series, or in combinations of parallel and series, flowing either in up flow or down flow modes.

Furthermore, the process can include selectively converting the lithium chloride in the lithium-rich solution to the lithium carbonate, the lithium hydroxide, or both. Lithium chloride can be converted by selectively converting the lithium chloride in the lithium-rich solution to lithium carbonate using a lithium carbonate crystallization process, and/or selectively concentrating the lithium chloride in the lithium-rich solution using a solvent extraction process, and then, selectively converting the lithium chloride in the lithium-rich solution to lithium hydroxide using electrolysis or chemical conversion. Additionally, the process can include selectively recovering the lithium carbonate from the lithium carbonate crystallization process, and then selectively converting the lithium carbonate to the lithium hydroxide.

In general, in a second aspect, the invention relates to a process of recovering lithium from a brine, such as a geothermal brine. The process includes providing a lithium containing brine, and then producing a lithium-rich solution from the clarified or polished brine by sequentially circulating the clarified or polished brine into process zones of a continuous counter-current ion exchange system. The continuous counter-current ion exchange system includes a plurality of ion exchange beds or columns containing a lithium selective adsorbent resin, and the process zones configured in parallel, in series, or in combinations of parallel and series, flowing either in up flow or down flow modes. The process also includes recovering lithium chloride, lithium hydroxide, lithium carbonate or a combination thereof from the lithium-rich solution.

Prior to the step of producing the lithium-rich solution, the process can further include producing a clarified or polished brine from the brine, the clarified or polished brine comprising lithium. The clarified or polished brine can be produced by selectively removing impurities from the brine and/or selectively recovering one or more metals, minerals or a combination thereof from the brine. In addition, the impurities can be removed by selectively removing at least iron and silica from the geothermal brine to form a substantially iron and silica free brine, and then, selectively at least removing manganese and zinc from the substantially iron and silica free brine to form the clarified brine. Moreover, the process can include selectively removing monovalent ions, divalent ions or both from the clarified brine to form the polished brine, such as selectively removing calcium, magnesium, boron, or a combination thereof from the clarified brine using an ion exchange circuit to form the polished brine.

The lithium-rich solution can be produced by sequentially circulating the brine through the process zones of a rotating or indexing manifold valve system of the continuous counter-current ion exchange circuit. Fluid flow through the ion exchange circuit can be controlled by pumping flow rates and a predetermined timing of rotation or indexing of the manifold valve system whereby the exchange beds or columns continually cycle through the process zones. The manifold valve system can include the plurality of ion exchange beds or columns containing the lithium selective adsorbent or resin.

Furthermore, the process can include selectively converting the lithium chloride in the lithium-rich solution to the lithium carbonate, the lithium hydroxide, or both. Lithium chloride can be converted by selectively converting the lithium chloride in the lithium-rich solution to lithium carbonate using a lithium carbonate crystallization process, and/or selectively concentrating the lithium chloride in the lithium-rich solution using a solvent extraction process, and then, selectively converting the lithium chloride in the lithium-rich solution to lithium hydroxide using electrolysis or chemical conversion. Additionally, the process can include selectively recovering the lithium carbonate from the lithium carbonate crystallization process, and then selectively converting the lithium carbonate to the lithium hydroxide.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
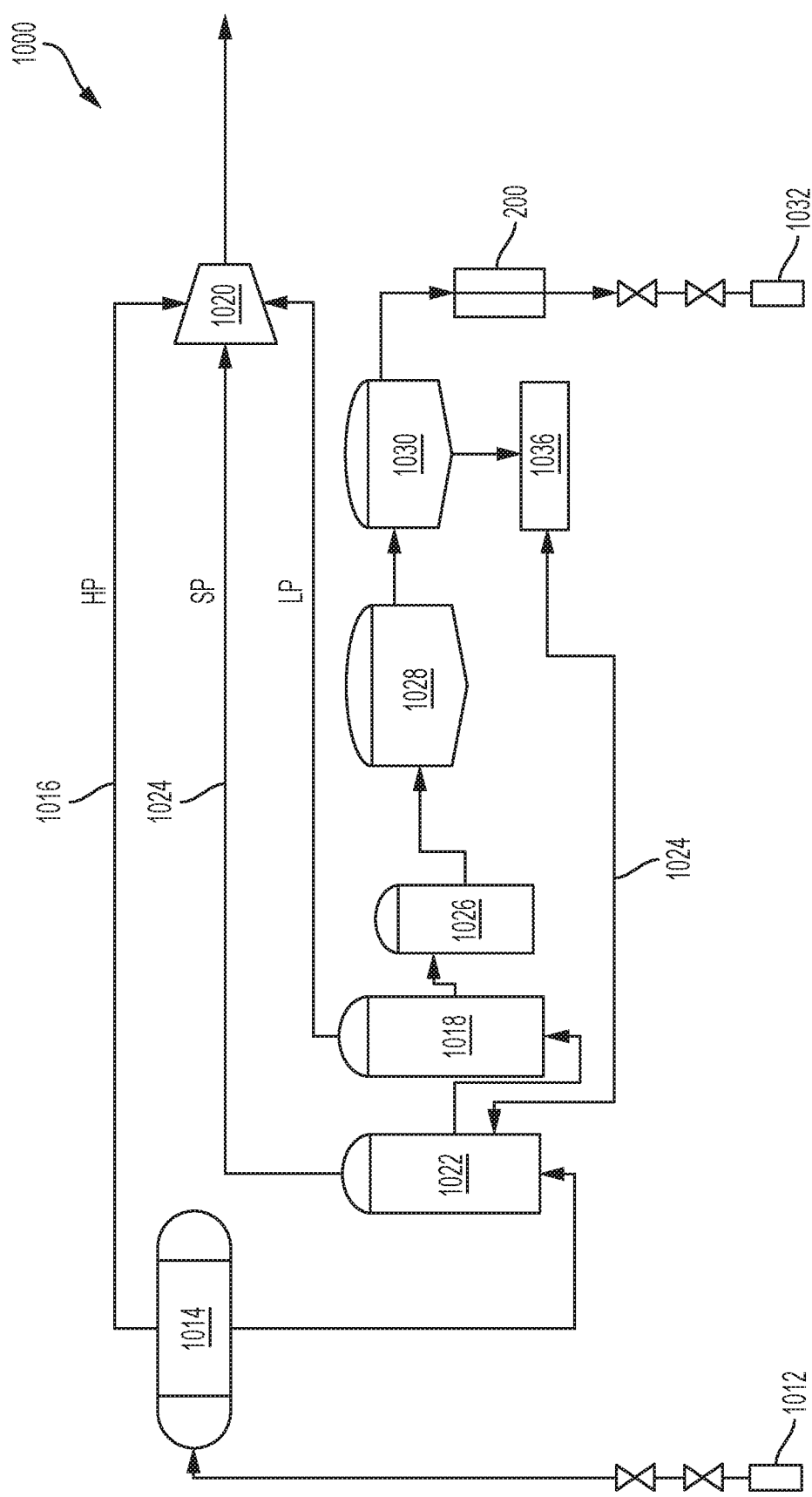
FIG. 1 is a process diagram of an example of a known crystallizer reactor clarifier process for power plant operations in the Salton Sea Known Geothermal Resource Area.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

This invention relates generally to a system and process for recovery of lithium from a geothermal brine, and more particularly to a system and sequential process for recovery of zinc, manganese, lithium or a combination thereof from a Salton Sea Known Geothermal Resource Area ("SSKGRA") brine. The system and process includes: 1) impurity removal (silica and metals); 2) selectively recovering lithium chloride from the brine flow and concentrating it using continuous counter-current ion exchange; and 3) lithium chloride conversion to lithium carbonate product (or lithium hydroxide).

A geothermal brine flow from production geothermal wells in the Salton Sea Known Geothermal Resource Area is flashed into steam to power a turbine generator to produce electricity. As part of the power plant operations and processes (the "power plant operations"), scaling constituents (mainly iron silicates and amorphous silica) are selectively removed to minimize scale formation from the brine on the plant equipment, vessel internals and associated piping before injection. In geothermal brines from the SSKGRA, the concentration of salt exceeds the solubility when the geothermal brine is flashed to atmospheric pressure so dilution water is added to keep the injected brine slightly below saturation with respect to salt. From this point in the power plant operations, the brine is routed to a series of reactor clarifiers to selectively reduce the concentration of silica in the injected brine to levels near saturation. The clarifiers precipitate silica, along with some iron, and lesser concentrations of arsenic, barium and lead, resulting in a polished geothermal brine suitable for reinjection into the SSKGRA via the power plant injection wells.

As generally illustrated in FIG. 1, existing power plant operations 1000 involve a liquid brine flow from geothermal production wells 1012 that is partially flashed into steam due to pressure losses as the liquid brine makes its way up the production well casing. The two-phase mixture of brine and steam is routed to a high-pressure separator 1014 where the liquid brine and high pressure steam are separated. High pressure steam 1016 is routed from the separator 1014 to a centrifugal type steam scrubber (not shown) that removes brine carryover from the steam, and from there the scrubbed high pressure steam 1016 is routed to the turbine generator 1020. The liquid brine from the high-pressure separator 1014 is flashed into a standard-pressure crystallizer 1022, and the standard pressure steam 1024 from the standard-pressure crystallizer 1022 is passed through a steam scrubber (not shown) and then the scrubbed standard pressure steam 1024 is routed to the turbine 1020. Precipitated solids from the clarifiers are mixed with the brine in the standard-pressure crystallizer 1022 and contact with the scaling materials, which reduces the scaling tendency in brine significantly.

A brine slurry mixture from the standard-pressure crystallizer 1022 is flashed into a low-pressure crystallizer 1018. Low pressure steam 1025 from the low-pressure crystallizer 1018 flows through a steam scrubber (not shown) and then either to a low-pressure turbine or to the low-pressure side of a dual entry turbine 1020. The brine slurry mixture is flashed to atmospheric pressure in an atmospheric flash tank 1026 and then flows into the clarifiers.

A primary clarifier 1028 comprising an internally recirculating reactor type clarifier precipitates silica down to close to equilibrium values for the various scaling constituents at the operating temperature of the brine, e.g., approximately 229° F. Primary Clarifier Overflow ("PCO") refers to the clarified brine flowing out of the primary clarifier 1028, and Primary Clarifier Underflow ("PCU") refers to the slurry flowing out of the bottom of the primary clarifier 1028. The precipitated solids are flocculated and settled to the bottom of the primary clarifier tank 1028. A relatively clear brine PCO passes from the primary clarifier 1028 to a secondary clarifier 1030 that removes additional suspended solids from the brine. Secondary Clarifier Overflow ("SCO") 1038 refers to the clarified brine flowing out of the secondary clarifier 1030, and Secondary Clarifier Underflow ("SCU") refers to the slurry flowing out of the bottom of the secondary clarifier 1030.

Flocculent and scale inhibitor are added between the primary clarifier 1028 and the secondary clarifier 1030 to enhance solids settling and to prevent the precipitation of radioactive alkaline earth salts. The stable SCO 1038 from the secondary clarifier 1030 is pumped into injection wells 1032. A portion of the precipitated solids from the PCU and the SCU is recycled upstream to the standard-pressure crystallizer 1022 as seed material 1034. Accumulated solids in both the primary clarifier 1028 and the secondary clarifier 1030 are routed to a horizontal belt filter ("HBF") 1036 for solids removal.

The HBF 1036 separates liquid from the solids in the slurry from the PCU and the SCU. The liquid can be separated by vacuum and passes through a filter cloth that rests on top of the carrier belt. The first stage of the HBF is a pH 1.0 acid wash of the slurry with hydrochloric acid to remove any lead precipitates from the filter cake. The second stage is a pH 9.5 condensate water wash to neutralize any residual acid in the filter cake. The third stage of the HBF steam dries the filter cake. The filter cake is transported to a local landfill for disposal.

The silica and iron concentrations in the brine at the PCO, SCO and injection wells of the power plant operations are summarized as follows in Table 1:

TABLE 1

| Location | Si as SiO$_2$ (mg/kg) | Fe (mg/kg) | As (mg/kg) | K (mg/kg) | Zn (mg/kg) | Mn (mg/kg) | Li (mg/kg) |
| --- | --- | --- | --- | --- | --- | --- | --- |
| PCO | 167 ± 25 | 1,579 ± 123 | 17.0 ± 4.0 | 20,600 ± 2,200 | 625 ± 42 | 1,705 ± 101 | 264 ± 24 |
| SCO | 159 ± 19 | 1,560 ± 88 | 16.9 ± 4.0 | 20,600 ± 2,600 | 639 ± 41 | 1,693 ± 134 | 265 ± 23 |
| Injection Wells | 160 ± 19 | 1,557 ± 87 | 16.9 ± 4.0 | 20,400 ± 2,500 | 621 ± 45 | 1,696 ± 92 | 265 ± 22 |

The polished brine 1038 that exits the SCO from the power plant 1000 with reduced amounts of scaling constituents is well suited for mineral extraction, and rather than injecting the polished brine into the injection well 1032, it is made immediately available to the inventive system and process 200 for recovery of lithium and/or other minerals.

The system and process 200 for recovery of minerals and lithium from a geothermal brine disclosed herein is further illustrated by the following examples, which are provided for the purpose of demonstration rather than limitation. An exemplary embodiment of the inventive system and process 200 for recovery of lithium and/or other minerals generally encompasses three sequential systems and processes: 1) an impurity removal circuit 300; then 2) a continuous countercurrent ion exchange (CCIX) circuit 400 for selectively recovering lithium chloride from the brine flow and concentrating it using a CCIX unit 402; and then 3) a lithium chloride conversion circuit 500 for converting lithium chloride to lithium carbonate or lithium hydroxide product.

Recovery of Lithium Carbonate

Figure 2:
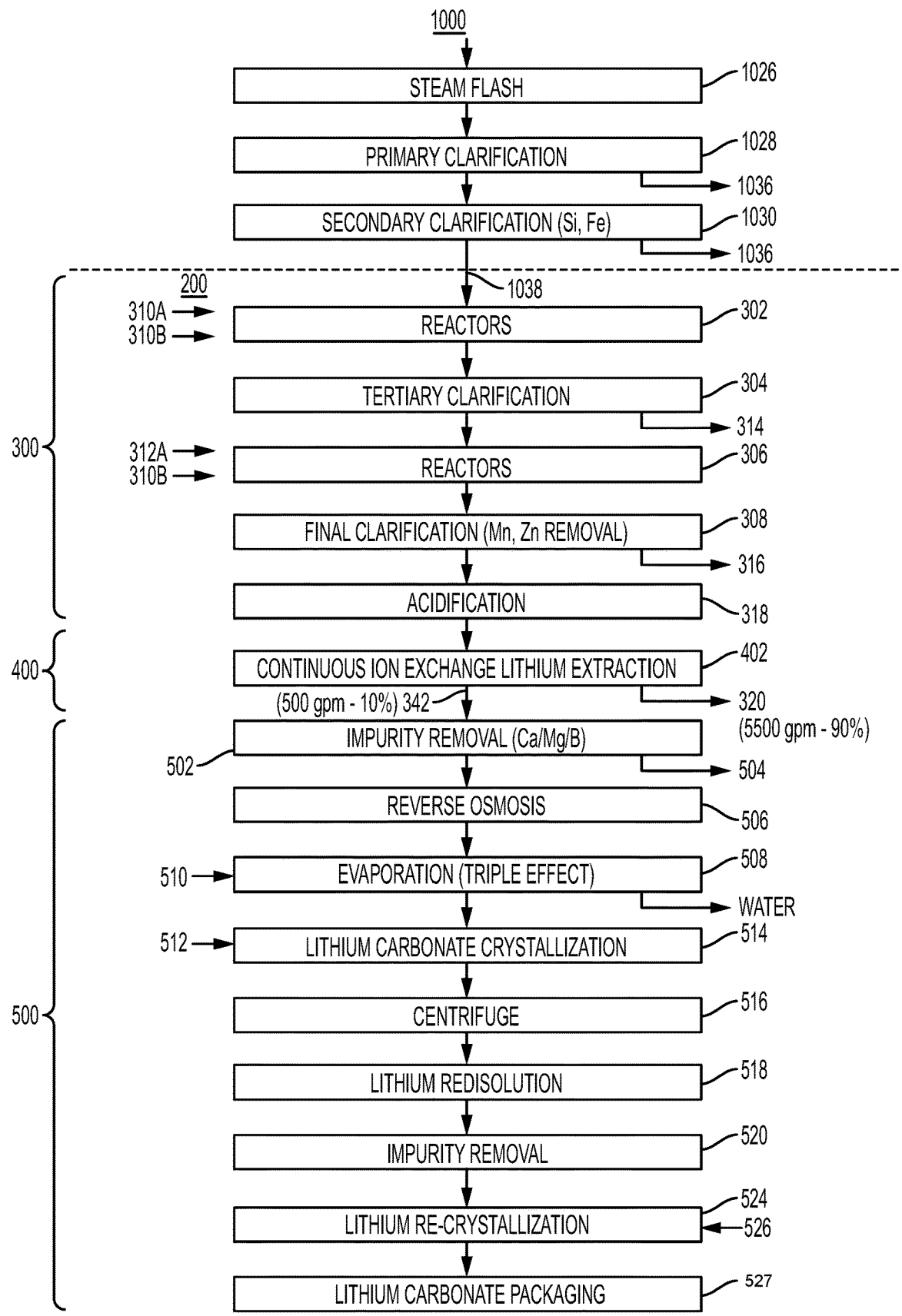
FIG. 2 is a flow chart of an example of a process for recovery of lithium carbonate in accordance with an illustrative embodiment of the invention disclosed herein.

As illustrated in FIG. 2, a feed brine, such as a SSKGRA geothermal brine or the brine 1038 that exits the SCO from the power plant 1000 having reduced amounts of scaling constituents passes to the inventive system and process 200 for mineral and/or lithium extraction. The feed brine is passed into the impurity removal circuit 300 having a first set of reaction tanks 302 and a tertiary clarifier 304 to remove iron and silica followed by a second set of reaction tanks 306 and a final clarifier 308 to remove manganese and zinc primarily. A first or iron/silica precipitation stage 300A of the impurity removal circuit 300 includes adding limestone 310A and injecting air 310B into brine. The air causes the iron to oxidize and the limestone slightly elevates the pH of the brine to counteract the oxidization of the iron by the air, which would otherwise reduce the pH of the brine. The tertiary clarifier 304 is positioned downstream of the first reaction tank 302 to settle out the silica and iron in the brine. The precipitated solids are settled to the bottom of the tertiary clarifier tank 304. The first stage 300A of the impurity removal circuit 300 reduces the iron concentration in the brine overflow from about 1,600 part per million (ppm) down to less than about 5 ppm and reduces the silica concentration in the brine overflow from about 60 ppm down to less than about 5 ppm. A relatively clear brine overflow passes from the tertiary clarifier 304 to a second or zinc/manganese precipitation stage 300B of impurity removal circuit 300.

The second stage 300B of the impurity removal circuit 300 includes adding limestone 312A and lime 312B to the brine in the second reaction tank 306. This causes the brine pH to elevate to around 8. The final clarifier 308 is positioned downstream of the second reaction tank 306 and allows the metals as oxides and/or hydroxides (primarily zinc and manganese) to settle. During the second stage 300B of the impurity removal circuit 300, the manganese concentration in the brine is reduced from about 1700 ppm down to less than about 10 ppm, while zinc concentration is reduced about 600 ppm down to less than 5 ppm in the second stage 300B of the impurity removal circuit 300. Accumulated solids in the tertiary clarifier 304 and the final clarifier 308 are respectively routed to a pneumapress filter HBF to prepare an Fe/Si filter cake 314 and a Mn/Zn filter cake 316.

Acid is then added 318 to the brine from the final clarifier 308 to reduce the pH back down to between 4.5 and 6.0, with a brine temperature between about 30° C. and about 100° C., which is suitable for the continuous countercurrent ion exchange (CCIX) circuit 400. The dissolved solids in the polished brine at this point in the process 100 comprise primarily salts (as chlorides) with high concentrations of sodium, potassium, and calcium. The lithium concentration is comparatively low at only ±250 parts per million (ppm).

The CCIX circuit 400 concentrates the lithium in the polished brine by approximately 10 times and simultaneously separates the lithium from the other salts (calcium is of particular concern for downstream operations). The target result is a lithium chloride product stream 342 (with some residual impurities) of around approximately 2,500 to 3,000 ppm lithium. The residual brine is returned for reinjection into the geothermal field through injection wells 320.

Figure 5:
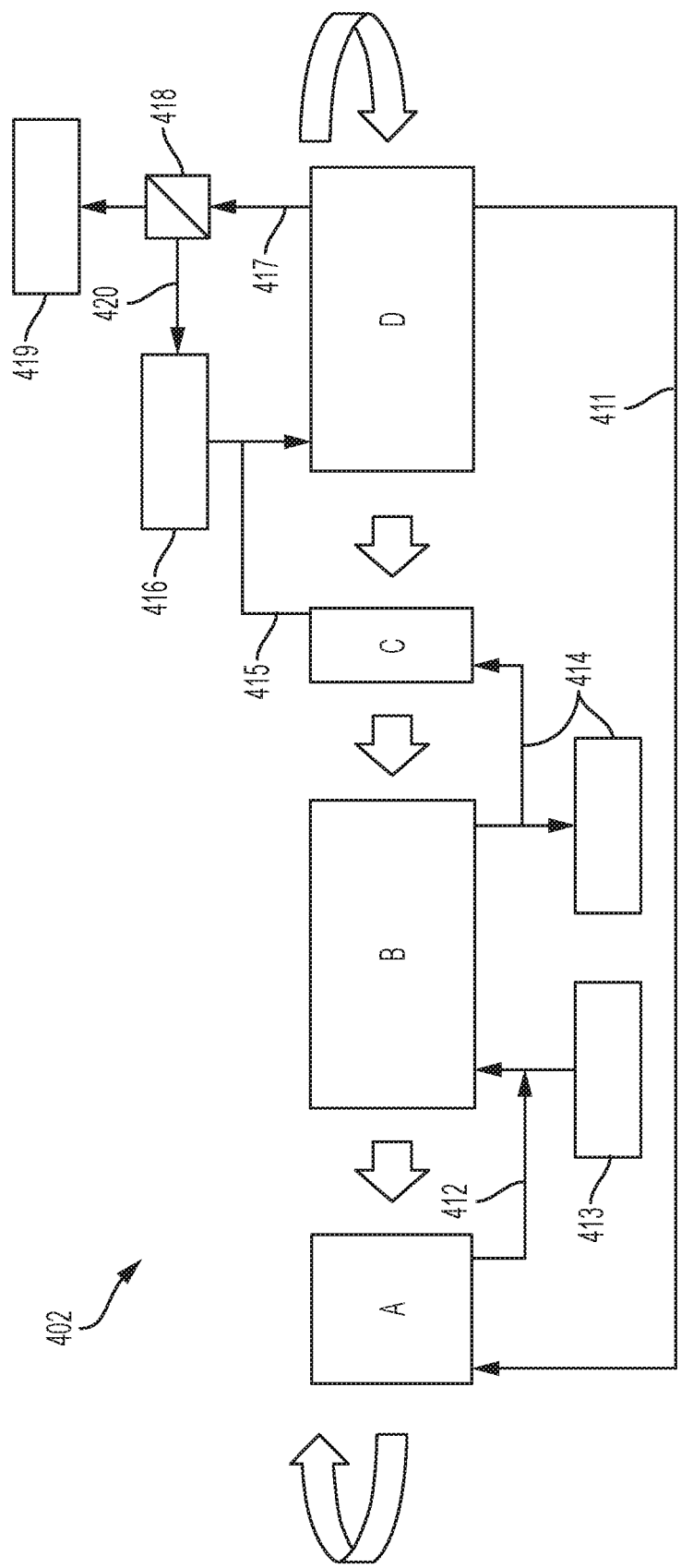
FIG. 5 is a flow chart diagram of an example of a continuous countercurrent ion exchange lithium recovery unit in accordance with an illustrative embodiment of the invention disclosed herein.

Referring now to FIG. 5, the CCIX circuit 400 includes a CCIX lithium extraction unit 402 having a plurality of ion exchange beds containing a lithium selective adsorbent (such as lithium alumina intercalates, alumina imbibed ion exchange resins), alumina-based adsorbents, and the like) that are sequentially subjected to individual process zones (A, B, C, D) as part of the CCIX circuit 400. Each adsorption zone A, B, C, and D includes one or more ion adsorbent beds or columns configured in parallel, in series, or in combinations of parallel and series, flowing either in up flow or down flow modes. Fluid flow is controlled by pumping flow rates and the timing of a rotating or indexing manifold valve system, creating a pseudo-simulated moving bed (SMB) process where the adsorption beds continually cycle through the individual process zones A, B, C and D.

The CCIX circuit 400 includes a series of sequential steps in a cyclic process. In order to eliminate the possibility of residual feed brine and brine salts from entering the elution zone D, which comprises lithium loaded adsorbent, largely unprocessed feed brine 411 is displaced from the adsorbent bed(s) of zone A using a portion of high lithium tenor product eluate 412 from zone D. The volume of displacement fluid drawn from zone D into zone A is at least enough to displace one adsorbent bed void fraction during an index time (the time interval between rotary valve indexes).

Then, brine feed 413 is introduced to the adsorbent bed(s) in zone B with a predetermined contact time sufficient to completely or almost completely exhaust the lithium selective adsorbent, and the depleted brine exiting zone B is sent to raffinate 414. Zone B is sized such that under steady state operation nearly the complete mass transfer zone is captured within the zone and the steady state operation treats the brine so that the maximum lithium loading is achieved without significant lithium leaving with the lithium depleted raffinate as tails.

Next, a portion of raffinate 414 is introduced to zone C to displace latent eluate solution 415, which is carried forward from zone D in the cyclic process, back to the inlet of zone D, the elution (stripping zone). The volume of displacement fluid drawn from zone B raffinate to displace lithium eluant back into zone C is at least enough to displace one adsorbent bed void fraction during the rotary valve index time.

Then, eluant 416 is introduced countercurrent to the adsorbent advance to produce an enhanced lithium product stream 417. Eluant 416 comprises low tenor lithium (as neutral salts, generally lithium chloride) in water at a concentration from 0 to 1000 mg/L lithium and at temperatures of 20° C. to 100° C. Properly tuned, the enhanced lithium product stream 417 will have a lithium tenor 10- to 20-fold that of the eluant feed 416 and greater than 99.8% rejection of brine hardness ions. The portion of high tenor lithium eluant which displaces the largely untreated brine from zone C is enough fluid to completely displace brine salts from the adsorbent before the adsorbent enters zone D. This means that a portion of the high tenor eluate is introduced to the adsorption zone B. Depending on the tuning parameters, this recycled lithium could double the effective concentration of lithium entering the zone. This enhanced feed tenor results in significantly increased lithium capacity and greater lithium recovery efficiency.

An optional membrane separation 418 can be inserted into stream 417, which includes but is not limited to, reverse osmosis or nano-filtration, to dewater and concentrate the lithium product solution 417 producing a product eluate with higher lithium tenor 419, while producing a recycle stream 420 suitable for use as make-up or as fresh eluant 416. The optional membrane dewatering of the high tenor lithium product would recycle a portion of the water used in the preparation of the eluant solution. Depending on the permeability of the membrane, a portion of the lithium could pass through the membrane without passing multivalent brine components and become the lithium make-up for fresh eluant.

The CCIX circuit 400 recovers greater than 97% of the lithium from the feed brine and produces a lithium product eluate solution 342 having a concentration 10- to 20-fold that of the feed brine with a 99.9% rejection of brine hardness ions. The production of this high purity lithium, directly from brine, without the need for extra rinse water, is an extremely cost effective process of obtaining commercially valuable and substantially pure lithium chloride, suitable for conversion to battery grade carbonate or hydroxide.

The resin-based adsorbents for use in the CCIX lithium recovery unit 402 may be prepared using large pore macroporous resin (plastic) beads that are steeped repeatedly in sodium aluminate. Sodium aluminate is manufactured by the dissolution of aluminum hydroxide in a caustic soda (NaOH) solution. The sodium aluminate gel is mixed with water to make a solution. As sodium aluminate is added to the resin bath tub, the pH jumps up and then as the reaction progresses, the pH will drop back to approximately 5. Then more sodium aluminate is added, and is a "layer" deposited on the resin. After 4-6 times, it then goes through a neutralization step (making sure the sodium aluminate is out) and then it takes a hot bath in a solution with lithium hydroxide at the proper pH.

Turn back now to FIG. 2, after leaving the CCIX circuit 400, the lithium chloride product stream 342 is passed to the lithium chloride conversion circuit 500 where the lithium concentrated is further increased to in excess of about 3,000 ppm. The lithium chloride conversion circuit 500 removes selected remaining impurities and further concentrates lithium in the lithium chloride product stream 342 before crystallization or electrolysis.

The lithium chloride conversion circuit 500 initially removes any remaining impurities 502, namely calcium, magnesium and boron, from the lithium chloride product stream 342. First, sodium hydroxide (caustic soda) is added in order to precipitate calcium and magnesium oxides from the lithium chloride product stream 342. The precipitated solids can produce a Ca/Mg filter cake 504. Boron is then removed by passing the lithium chloride product stream 342 through a boron ion exchange (IX) circuit 528. The boron IX circuit is filled with an adsorbent that preferentially attracts boron, and divalent ions (essentially calcium and magnesium) are further removed in a divalent ion exchange (IX) circuit 530. This "polishing" step 502 ensures that these calcium, magnesium and boron contaminants do not end up in the lithium carbonate or lithium hydroxide crystals.

Then, the lithium chloride conversion circuit 500 uses a reverse osmosis membrane step 506 to initially concentrate lithium in the lithium product stream 342 (target estimate from approximately 3,000 ppm to 5,000 ppm). A triple effect evaporator 508 is then used to drive off water content and further concentrate the lithium product stream. The triple effect evaporator 508 utilizes steam 510 from geothermal operations and/or fuel boiler to operate. After processing through the evaporator 508, lithium concentration in the product stream is increased from about 5,000 ppm to about 30,000 ppm.

The next steps in the lithium chloride conversion circuit 500 convert the lithium chloride in solution to a lithium carbonate crystal. Sodium carbonate is added 512 to the lithium chloride product stream 342 to precipitate lithium carbonate 514. The lithium carbonate 514 slurry is sent to a centrifuge 516 to remove any moisture resulting in lithium carbonate cake. The lithium carbonate cake is re-dissolved 518, passed through a final purification or impurity removal step 520, and recrystallized 522 with the addition of carbon dioxide 524. The crystallized lithium carbonate product is then suitable for packaging 527.

Recovery of Lithium Hydroxide

Figure 3:
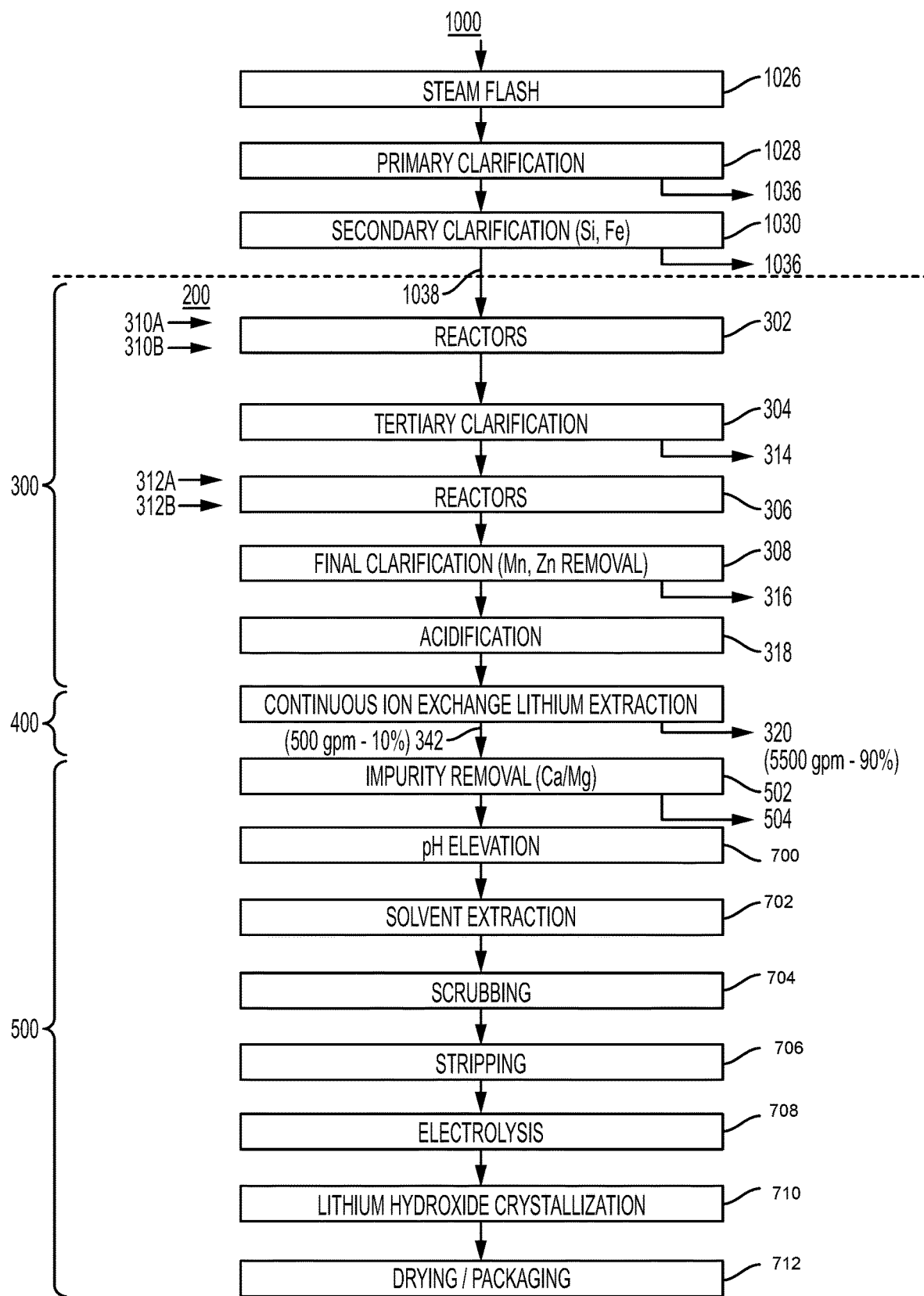
FIG. 3 is a flow chart of an example of a process for recovery of lithium hydroxide in accordance with an illustrative embodiment of the invention disclosed herein.

FIG. 3 illustrates another exemplary embodiment of the system and process 200 for recovery of lithium. After leaving the CCIX circuit 400, rather than using evaporation 508 exemplified in FIG. 2, a solvent extraction process 702 concentrates lithium in the lithium chloride product stream 342 using liquid-liquid separation, and after solvent extraction 702 and electrolysis 708, the lithium is subsequently crystallized 710 into lithium hydroxide product 712.

Similar to the embodiment illustrated in FIG. 2, the lithium chloride conversion circuit 500 first precipitates calcium and magnesium 502 through the addition sodium hydroxide (caustic soda) resulting with a Ca/Mg filter cake is produced 504. The pH of the lithium chloride product stream 342 is lowered to about 2.5 in step 700 and then the acidified lithium chloride product stream 342 is introduced to the solvent extraction step 702 in pulsed columns (tall vertical reaction vessels). The flow is scrubbed 704 and then stripped 706 with sulfuric acid producing a lithium sulfate product. The lithium sulfate product goes through an electrolysis unit 708 producing lithium hydroxide crystals 710. The lithium hydroxide crystals are then dried and packaged 712.

Selective Recovery of Zinc, Manganese and Lithium

Figure 4A:
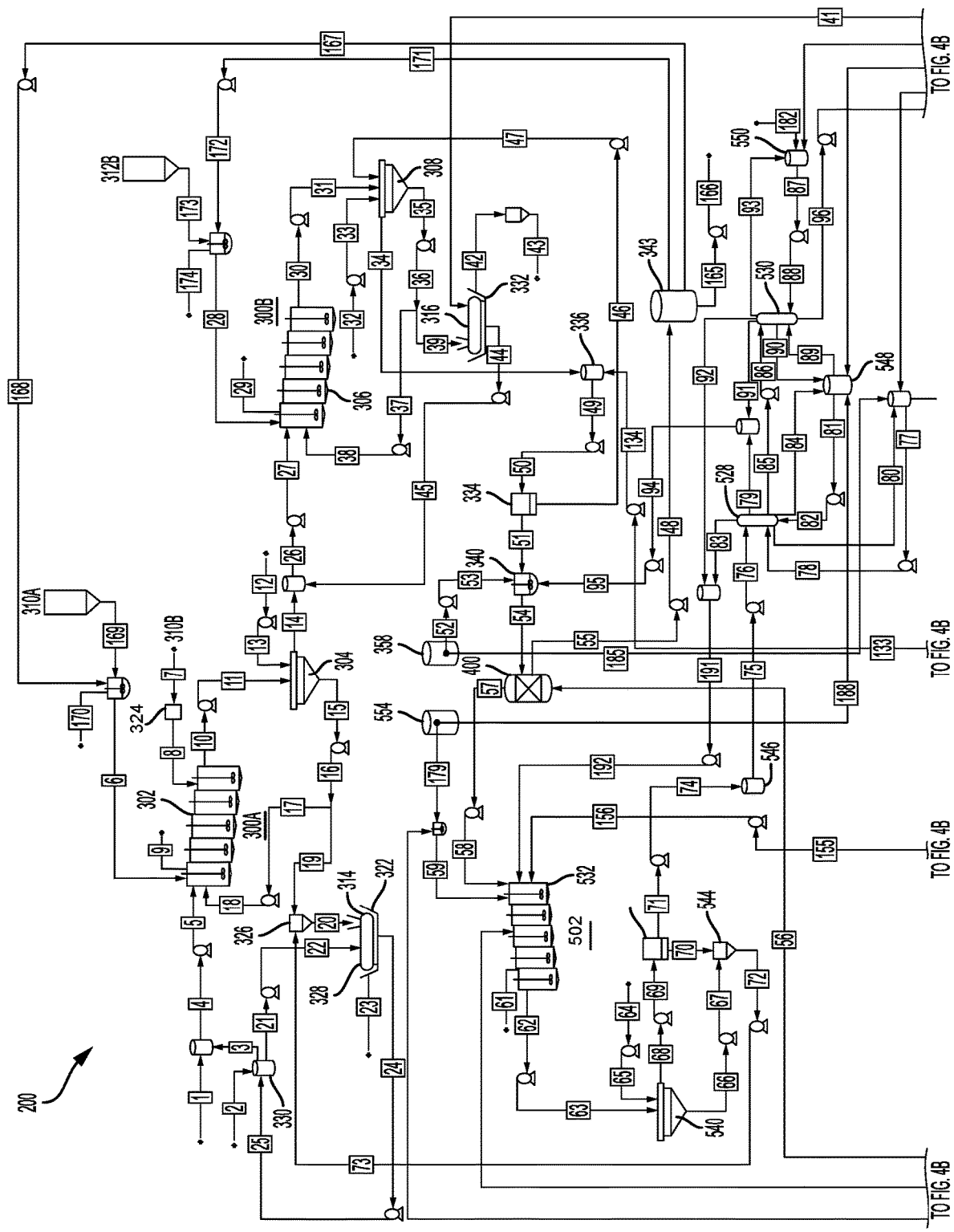
FIG. 4A is a process flow diagram of a system and process for recovery of select minerals and lithium in accordance with an illustrative embodiment of the invention disclosed herein.
Figure 4B:
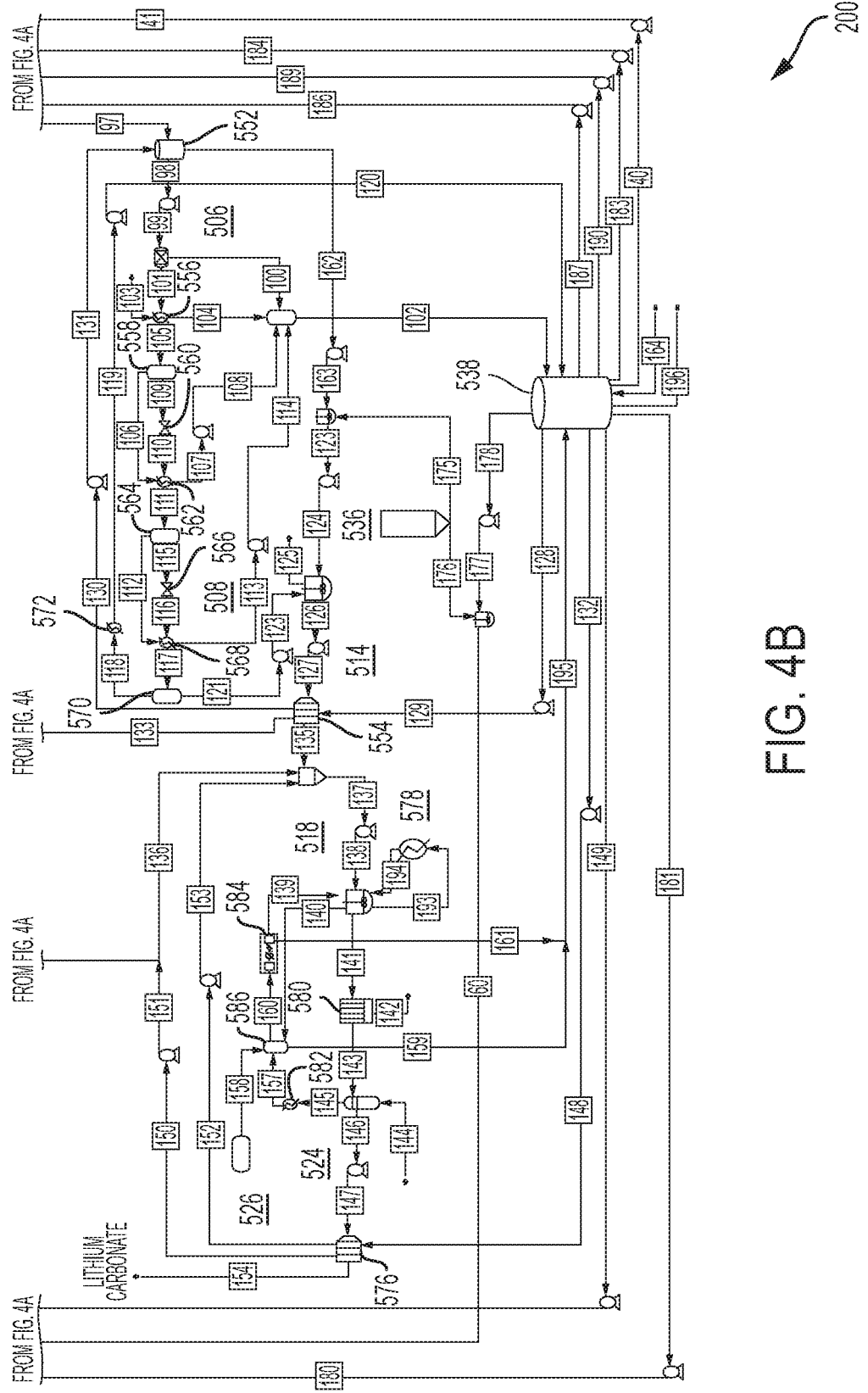
FIG. 4B is a continuation of the process flow diagram shown in FIG. 4A.

Turning now to FIGS. 4 illustrating yet another exemplary embodiment of the system and process 200 for recovery of lithium, the feed source is an incoming brine (e.g., a SSKGRA geothermal brine or the polished brine 1038) (stream 1) and dilution water (stream 2). The incoming dilution water (stream 2) is mixed with filtrate (stream 25) from a Fe/Si precipitate filter 322, then split, part (stream 21) being used as wash to the Fe/Si precipitate filter 322 and the balance (stream 3) being added to the incoming brine (stream 1). The combined brine, dilution water and Fe/Si filtrate (stream 4) is pumped (stream 5) to the Fe/Si precipitation stage 300A of the impurity removal circuit 300. Limestone 310A (stream 169) is slurried with recycled barren brine (stream 168). The limestone/recycled barren brine slurry is added (stream 6) to the first set of reaction tanks 302 along with recycled precipitate seed (stream 18). Air is injected (stream 7/8) into the first tank 302 using a blower 324. The iron is oxidized, and iron and silica are precipitated according to the following stoichiometry:

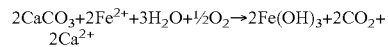

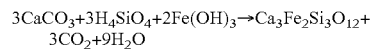

The spent air is vented (stream 9) from the first tanks 302, and the exit slurry (stream 10) is pumped (stream 11) to a thickener or clarifier 304 where flocculent (stream 12/13) is added and the solids are settled out. The underflow from the clarifier 304 (stream 15) is pumped (stream 16) back to the first set of reaction tanks 302 as seed (stream 17) and (stream 19) to the filter feed tank 326. Precipitate from the Ca/Mg precipitation stage 540 of the impurity removal circuit 502 is added (stream 73) and the combined slurry (stream 20) is filtered in the Fe/Si filter 322. The resulting Fe/Si filter cake is washed with dilution water (stream 22) and the washed filter cake 328 (stream 23) leaves the circuit 300. The filtrate (stream 24) is pump (stream 25) to the dilution water tank 330.

The thickener overflow (stream 14) from the Fe/Si precipitation stage 300A is combined with filtrate from a Zn/Mn precipitate filter 332 (stream 45) in a feed tank 338 and the combined solution (stream 26) is pumped (stream 27) to the Zn/Mn precipitation stage 300B. Recycled precipitate (stream 38) is added as seed and lime 312B (stream 173) is slaked with recycled barren solution (stream 172). Any gas released is vented (stream 174). The lime/recycled barren solution is added (stream 28) to the second set of reaction tanks 306 to raise the pH to just over 8 and precipitate zinc, manganese and lead oxides/hydroxides.

Any gas released is vented (stream 29) from the second tanks 306. The exit slurry (stream 30) is pumped (stream 31) to a thickener or clarifier 308. Recycled solids from a subsequent polishing filter 334 (stream 47) and flocculent (stream 32/33) are added and the precipitated hydroxides are settled out. The thickener underflow (stream 35) is pumped (stream 36) to seed recycle (stream 37) and to the Zn/Mn precipitate filter 332 (stream 39). The resulting Zn/Mn filter cake is washed with process water (stream 41) and the washed filter cake 336 (stream 43) leaves the circuit 300. The filtrate (stream 44) is pumped (stream 45) to the feed tank 338 ahead of the Zn/Mn precipitation stage 300B. The thickener overflow (stream 34) is mixed with mother liquor (stream 134) from a first precipitation of lithium carbonate 514 and the combined solution (stream 49) is pumped (stream 50) through the polishing filter 334 to capture residual solids. The captured solids are backwashed out (stream 46) and sent to the Zn/Mn precipitate thickener 308.

The filtrate from the polishing filter 334 (stream 51) is mixed with spent eluant from the divalent IX circuit (stream 95) and hydrochloric acid 338 (stream 52/53) is added to reduce the pH to approximately 5.5. The resulting solution is cooled to approximately 185° F. in the mixing tank 340 and the cooled solution (stream 54) is passed through a continuous counter-current ion exchange (CCIX) circuit 400 in which the lithium chloride is selectively captured onto the adsorbent. The resulting barren solution (stream 55) is pumped (stream 48) to a holding tank 343 from which it is distributed as follows:

to slurry the limestone to the Fe/Si precipitation stage 300A (stream 167);

to slake the lime to the Zn/Mn precipitation stage 300B (stream 171); and the balance (stream 165) is pumped away (stream 166) to be reinjected into the injection wells 320.

The loaded adsorbent is eluted with process water (stream 56) and the resulting eluate (stream 57) is pumped (stream 58) to a third set of reaction tanks 532 for addition impurity removal 502, initially calcium and magnesium precipitation. Sodium hydroxide 554 (stream 179) is dissolved in process water (stream 181) and added (stream 59) to the tanks 532. Sodium carbonate 536 (stream 176) is dissolved in process water (stream (177) pumped from a process water reservoir 538 and added (stream 60). A bleed of mother liquor (stream 156) from a second precipitation of lithium carbonate 524 and the spent regenerant from the boron IX circuit 528 (stream 192) are also treated in the Ca/Mg precipitation section of the lithium chloride conversion circuit 500. The alkali earth ions (mainly $Ca^{2+}$ and $Mg^{2+}$) are precipitated according to the following stoichiometry:

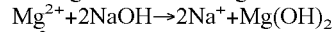
$Mg^{2+}+2NaOH \rightarrow 2Na^++Mg(OH)_2$

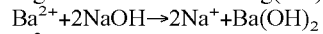
$Ba^{2+}+2NaOH \rightarrow 2Na^++Ba(OH)_2$

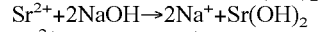
$Sr^{2+}+2NaOH \rightarrow 2Na^++Sr(OH)_2$

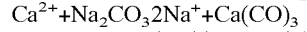
$Ca^{2+}+Na_2CO_3 2Na^++Ca(CO)_3$

Any vapor evolved is vented (stream 61). The exit slurry (stream 62) is pumped (stream 63) to a thickener or clarifier 540, flocculent is added (stream 64/65) and the precipitate is settled out. The overflow (stream 68) is pumped (stream 69) through a polishing filter 542. The underflow (stream 66) is pumped (stream 67) to a mixing tank 544 where it joins the solids (stream 70) from the polishing filter 542 and the combined slurry (stream 72) is pumped (stream 73) back to the feed tank 326 ahead of the Fe/Si filter 322. The filtrate (stream 71) from the polishing filter 542 is pumped (stream 74) to a feed tank 546 ahead of the boron IX circuit 528.

The filtrate (stream 75) from the Ca/Mg precipitation section of the lithium chloride conversion circuit 500 is pumped (stream 76) through the boron IX circuit 528 in which boron is extracted onto an ion exchange resin. The loaded resin is stripped with dilute hydrochloric acid (stream 78) that is made from concentrated hydrochloric acid (stream 185), process water (stream 186) and recycled eluate (stream 80). The first 50% of the spent acid (stream 79), assumed to contain 80% of the boron eluted from the loaded resin, is mixed with similar spent acid from the subsequent divalent IX circuit 530 and recycled to the feed to the CCIX circuit 400 (stream 94). The balance of the spent acid (stream 80) is recycled to the eluant make-up tank and recycled (stream 77). The stripped resin is regenerated with dilute sodium hydroxide (stream 82) that is made from fresh sodium hydroxide (stream 188), process water (stream 189) and recycled regenerant (stream 84). The first 50% of the spent regenerant (stream 83) is recycled to the Ca/Mg precipitation section and the balance (stream 84) returns to a regenerant make-up tank 548 and is recycled (stream 81).

The boron-free product solution (stream 85) is pumped (stream 86) through divalent IX circuit 530 in which 99 percent of any remaining divalent ions (essentially only $Ca^{2+}$ and $Mg^{2+}$) are captured by the resin. The loaded resin is stripped with dilute hydrochloric acid (stream 88) that is made from fresh hydrochloric acid (stream 182), process water (stream 184) and recycled spent acid (stream 93). The first 50% of the spent acid (stream 91) joins the first half of the spent acid from the boron IX circuit 528 and the combined solution (stream 94) is sent back to the feed tank 340 ahead of the CCIX circuit 400. The balance of the spent acid (stream 93) goes back to an eluant make-up tank 550 and is recycled (stream 87). The stripped resin is converted back to the sodium form by regeneration with dilute sodium hydroxide (stream 89). The first 50% of the spent regenerant (stream 92), assumed to have regenerated 80% of the resin, joins the spent regenerant (stream 83) from the boron ion exchange stage and goes back (stream 191) to the Ca/Mg precipitation section. The balance of the spent regenerant (stream 90) returns to the regenerant make-up tank 548.

The purified solution (stream 96) is pumped (stream 97) to a feed tank 552 ahead of reverse osmosis 506 and mixed with wash centrate (stream 131) from a first lithium carbonate centrifuge 554. The combined solution is split, part (stream 162) being used to dissolve sodium carbonate and the balance (stream 98) being pumped (stream 99) through a reverse osmosis stage in which the water removal is manipulated to give 95 percent saturation of lithium carbonate in the concentrate (stream 101). The permeate goes to the process water reservoir (stream 100).

The partially concentrated solution from reverse osmosis 506 is further concentrated in a triple-effect evaporation 508. The solution ex reverse osmosis (stream 101) is partly evaporated by heat exchanger 556 with incoming steam (stream 103). The steam condensate (stream 104) goes to the process water reservoir 538, and the steam/liquid mixture to the heat exchanger 556 (stream 105) is separated in a knock-out vessel 558. The liquid phase (stream 109) passes through a pressure reduction 560 (stream 110) and is further evaporated in a heat exchanger 562 with steam (stream 106) from the first knock-out vessel 558. The condensate (stream 107) is pumped (stream 108) to the process water reservoir 538. The steam-liquid (stream 111) mixture is separated in a second knock-out vessel 564. The liquid (stream 115) goes through another pressure reduction step 566 (stream 116) and is evaporated further another heat exchanger 568 with steam (stream 112) from the second knock-out vessel 564. The condensate (stream 113) is pumped (stream 114) to the process water reservoir 538. The steam-liquid mixture (stream 117) is separated in a third knock-out vessel 570. The steam (stream 118) is condensed (stream 119) by heat exchanger 572 with cooling water and pumped (stream 120) to the process water reservoir 538.

The concentrated solution (stream 121) is pumped (stream 122) to the lithium carbonate crystallization section 514. Sodium carbonate 536 (stream 175) is dissolved in dilute lithium solution (stream 163) from the feed tank 552 ahead of reverse osmosis 506 and added (stream 123/124) to precipitate lithium carbonate. Any vapor evolved is vented (stream 125). The resulting slurry (stream 126) is pumped (stream 127) to a centrifuge in which the solution is removed, leaving a high solids cake. A small amount (stream 129) of process water is used to wash the solids. The wash centrate (stream 130) is returned to the feed tank ahead of reverse osmosis 506. The primary centrate (stream 133) is recycled to a feed tank 336 ahead of the polishing filter 334 before the CCIX circuit 400.

The washed solids (stream 135) from the first centrifuge 554 are mixed with wash (stream 136) and primary centrate (stream 153) from a second centrifuge 576. The resulting slurry (stream 137) is pumped to 15 bar abs. (stream 138) and contacted with pressurized carbon dioxide 526 (stream 139) to completely dissolve the lithium carbonate according to the following stoichiometry:

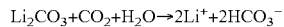

$$Li_2CO_3 + CO_2 + H_2O \rightarrow 2Li^+ + 2HCO_3^-$$

The amount of primary centrate is manipulated to give 95 percent saturation of lithium carbonate in the solution (stream 141) leaving the redissolution step 518. Any other species (Ca, Mg) remain as undissolved carbonates. The temperature of this step is held at 80° F. by heat exchange with chilled water 578 (stream 194 in, stream 193 out). The resulting solution of lithium bicarbonate (stream 141) is filtered 580 and the solid impurities leave the circuit 500 (stream 142). The filtrate (stream 143) is heated by live steam (stream 144) injection, to decompose the dissolved lithium bicarbonate to solid lithium carbonate and gaseous carbon dioxide:

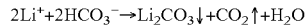

$$2Li^+ + 2HCO_3^- \rightarrow Li_2CO_3 \downarrow + CO_2 \uparrow + H_2O$$

The carbon dioxide formed (stream 145) is cooled by chiller 582 (stream 157) and mixed with surplus carbon dioxide (stream 140) from the re-dissolution step 518 and make-up carbon dioxide 528 (stream 158) in a knock-out vessel 586 from which the condensed water (stream 159) is removed and the carbon dioxide (stream 160) is compressed 584 and returned (stream 139) to the lithium re-dissolution step 518. The slurry of purified lithium carbonate (stream 146) is pumped (stream 147) to the second centrifuge 576 in which it is separated and washed with process water (stream 148). The wash centrate (stream 152) is returned to the re-dissolution step 518. The primary centrate (stream 150) is pumped (stream 151) back to the Ca/Mg precipitation section (stream 155) and to the lithium re-dissolution step (stream 136). The washed solids (stream 154) leave the circuit as the lithium carbonate product.

The condensate from the carbon dioxide knock-out vessel 586 (stream 159) and condensate from the carbon dioxide compressor 584 (stream 161) are combined and sent (stream 195) to the process water reservoir 538. The permeate from the reverse osmosis 506 (stream 100) and the condensates from the evaporation sequence 508 (streams 104, 108, 14) also go to the process water reservoir 538. Make-up water (stream 164) is added to the process water reservoir 538 if necessary to balance the following requirements for process water:

wash to the Zn/Mn precipitate filter 332 (stream 40); eluate to the CCIX circuit 400 (stream 149); centrifuge 554/576 wash water (streams 128/132); and reagent make-up water (streams 178/181/183/187/190).

Selective Recovery of Zinc and Manganese

Figure 6:
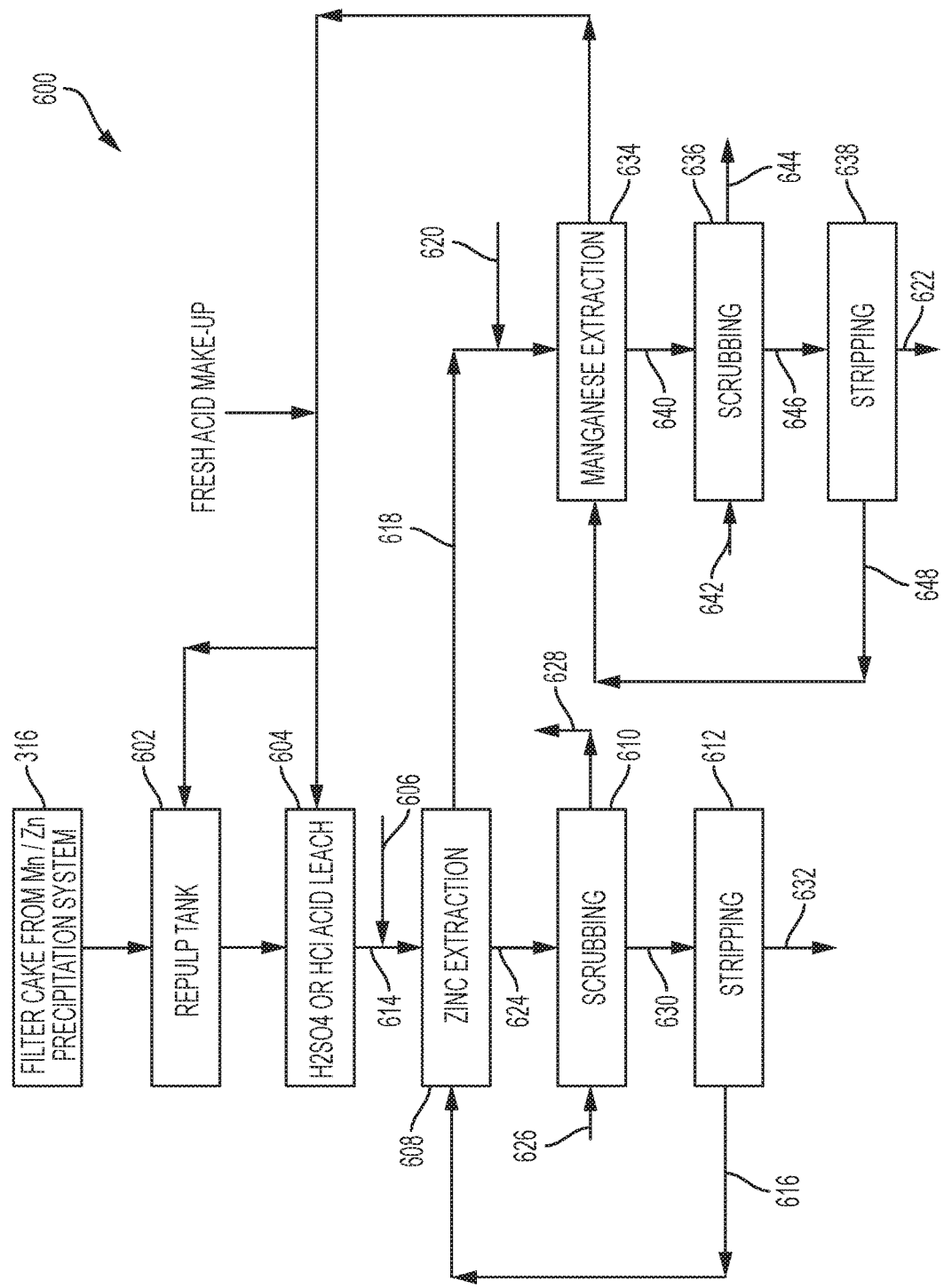
FIG. 6 is a flow chart of an example of zinc and manganese solvent extraction circuit in accordance with an illustrative embodiment of the invention disclosed herein.

FIG. 6 shows an illustrative example of mineral recovery as part of the inventive system and process 200 disclosed herein. After the impurity removal circuit 300, the recovery of metals from the second filter cake 316 is possible through a solvent extraction (SX) circuit 600. The SX circuit leaches manganese and zinc from the filter cake with an application of an acid and then selectively strips the manganese and zinc using a solvent under different pH conditions. The resulting intermediate products are zinc sulfate liquor and manganese sulfate liquor, both of which can be sold as agricultural products, processed further by electrowinning into metallic form, or as feedstock to alternative products such as electrolytic manganese dioxide among others.

The SX circuit 600 begins with leaching 604 the second filter cake 316 in a stirred, repulp reactor 602 with sulfuric acid ($H_2SO_4$) or hydrochloric acid (HCl) to reduce the pH down to about 2.5 (606). A reducing agent such as NaHS or $SO_2$ is added to the reactor 602 to ensure all of the manganese is in the +2 valence state for leaching. This improves the kinetics and yield of the acid leach. The discharge from the leach reactor 602 will have its pH raised to approximately 5-6 with lime to precipitate any residual iron. The slurry will then be pumped to a polishing filter (not shown) followed by a pH adjustment to approximately 2 to approximately 3. This becomes the Zn/Mn aqueous feed solution 614 to the SX circuit 600.

The SX circuit 600 includes a zinc extraction stage 608, a zinc scrubbing stage 610, and a zinc stripping stage 612. The Zn/Mn aqueous feed solution 614 and an organic solvent 616 (e.g., Cytex 272) are fed in a counter-current manner into a first stage contactor in which the two phases are mixed and Zn is transferred from the aqueous phase into the organic phase. After settling, the aqueous raffinate is separated 618 and pH adjusted to between approximately 4.5 and approximately 5.5. After pH adjustment 620, the raffinate containing Mn 618 is sent for recovery of a manganese sulfate product liquor 622.

From the zinc extraction stage 608, the zinc loaded solvent 624 is fed into a second stage contactor where it is scrubbed with a suitable aqueous solution 626 to remove small amounts of impurities remaining. After settling in the zinc scrubbing stage 610, the scrub raffinate will be recycled to an appropriate stream 628. The loaded solvent 630 is then pumped to the zinc stripping stage 612 and fed into a third stage contactor in which the Zn is stripped from the organic phase by a sulfuric acid solution. The aqueous concentrated strip ZnSO4 product liquor 632 then goes for further processing depending on the desired product form. The stripped solvent 616 is recycled back to the zinc extraction stage 608.

The SX circuit 600 includes a manganese extraction stage 634, a manganese scrubbing stage 636, and a manganese stripping stage 638. Similar to the zinc SX circuit, the raffinate containing Mn 618 and an organic solvent 648 (e.g., Cytex 272) are fed in a counter-current manner into a first stage contactor in which the two phases are mixed and Mn is transferred from the aqueous phase into the organic phase. The manganese loaded solvent 640 is fed into a second stage contactor where it is scrubbed with a suitable aqueous solution 642 to remove small amounts of impurities remaining. After settling in the manganese scrubbing stage 636, the scrub raffinate will be recycled to an appropriate stream 644. The loaded solvent 646 is then pumped to the manganese stripping stage 638 and fed into a third stage contactor in which the Mn is stripped from the organic phase by a sulfuric acid solution. The aqueous concentrated strip MnSO4 product liquor 622 then goes for further processing depending on the desired product form. The stripped solvent 648 is recycled back to the manganese extraction stage 634.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Systems and processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed:

1. A process of recovering lithium from a brine, said process comprising the steps of:
    a. producing a lithium-rich solution from said brine by sequentially circulating said brine through a plurality of process zones of a rotating or indexing manifold valve system, said brine comprising lithium, said manifold valve system comprising a plurality of ion exchange beds or columns containing a lithium selective adsorbent or resin; and
    b. recovering lithium chloride, lithium hydroxide, lithium carbonate, or a combination thereof from said lithium-rich solution using an eluant solution comprising lithium chloride and water.

2. The process of claim 1 wherein said brine is a geothermal brine.

3. The process of claim 1, prior to said step of producing said lithium-rich solution, further comprising the step of producing a clarified or polished brine from said brine, said clarified or polished brine comprising lithium.

4. The process of claim 3 wherein the step of producing said clarified or polished brine further comprises the steps of selectively removing impurities from said brine and/or selectively recovering one or more metals, minerals or a combination thereof from said brine.

5. The process of claim 4 wherein said step selectively removing impurities from said brine further comprises the steps of:

a. selectively removing at least iron and silica from said geothermal brine to form a substantially iron and silica free brine; and
b. selectively at least removing manganese and zinc from said substantially iron and silica free brine to form said clarified brine.

6. The process of claim 5 further comprising the step of selectively removing monovalent ions, divalent ions or both from said clarified brine to form said polished brine.

7. The process of claim 6 further comprising the step of selectively removing calcium, magnesium, boron, or a combination thereof from said clarified brine using an ion exchange circuit to form said polished brine.

8. The process of claim 1 wherein said step of producing said lithium-rich solution further comprises sequentially circulating said brine through said process zones of a continuous counter-current ion exchange circuit of said manifold valve system.

9. The process of claim 8 wherein fluid flow through said ion exchange circuit is controlled by pumping flow rates and a predetermined timing of rotation or indexing of said manifold valve system whereby said exchange beds or columns continually cycle through said process zones.

10. The process of claim 8 wherein said process zones of said continuous counter-current ion exchange circuit of said manifold valve system are configured in parallel, in series, or in combinations of parallel and series, flowing either in up flow or down flow modes.

11. The process of claim 1 further comprising the step of selectively converting said lithium chloride in said lithium-rich solution to said lithium carbonate, said lithium hydroxide, or both.

12. The process of claim 11 wherein said step of selectively converting said lithium chloride further comprises the steps of:
selectively converting said lithium chloride in said lithium-rich solution to lithium carbonate using a lithium carbonate crystallization process; and/or
selectively concentrating said lithium chloride in said lithium-rich solution using a solvent extraction process, and, selectively converting said lithium chloride in said lithium-rich solution to lithium hydroxide using electrolysis or chemical conversion.

13. The process of claim 12 further comprising the steps of:
selectively recovering said lithium carbonate from said lithium carbonate crystallization process; and
selectively converting said lithium carbonate to said lithium hydroxide.

14. The process of claim 1 wherein said lithium chloride selective absorbent or resin is a manufactured resin-based alumina imbibed adsorbent, a lithium alumina intercalates adsorbent, an alumina imbibed ion exchange resin, or an alumina-based adsorbent.

15. The process of claim 1 wherein said step recovering lithium chloride, lithium hydroxide, lithium carbonate, or a combination thereof from said lithium-rich solution further comprises the step of:
b. recovering lithium chloride, lithium hydroxide, lithium carbonate, or a combination thereof from said lithium-rich solution using said eluant solution comprising lithium and water at a concentration of up to about 1000 mg/kg lithium and at temperatures of about 5° C. to about 100° C.

16. The process of claim 3 wherein said brine has a temperature of about 229° F+23° F.

17. The process of claim 5 wherein said substantially iron and silica free brine has an iron concentration of less than about 5 ppm and a silica concentration of less than about 5 ppm.

18. The process of claim 5 wherein said clarified brine has a manganese concentration of less than about 10 ppm and a zinc concentration of less than about 5 ppm.

* * * * *